United States Patent
Nam et al.

(10) Patent No.: US 7,292,853 B2
(45) Date of Patent: Nov. 6, 2007

(54) ROAMING SERVICE METHOD AND SYSTEM IN MULTI-ZONE PRIVATE WIRELESS NETWORK SYSTEMS

(75) Inventors: Hyun-Ho Nam, Suwon-si (KR); Jong-Hyuk Baek, Seoul (KR); Yong-Sung Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 141 days.

(21) Appl. No.: 10/981,589

(22) Filed: Nov. 5, 2004

(65) Prior Publication Data

US 2005/0101327 A1    May 12, 2005

(30) Foreign Application Priority Data

Nov. 8, 2003    (KR)    ...................... 10-2003-0078893

(51) Int. Cl.
*H04Q 7/20* (2006.01)
*H04Q 7/00* (2006.01)

(52) U.S. Cl. .................. 455/433; 455/436; 370/331
(58) Field of Classification Search ................ 455/433, 455/436; 370/331
See application file for complete search history.

(56) References Cited

U.S. PATENT DOCUMENTS

| | | | | |
|---|---|---|---|---|
| 5,711,002 | A | * | 1/1998 | Foti ............................ 455/433 |
| 6,016,425 | A | | 1/2000 | Bannister |
| 6,097,942 | A | * | 8/2000 | Laiho ...................... 455/414.1 |
| H001897 | H | * | 10/2000 | Fletcher et al. ............. 455/433 |
| 6,253,078 | B1 | | 6/2001 | Lee |
| 6,408,182 | B1 | * | 6/2002 | Davidson et al. ........... 455/433 |
| 6,697,621 | B2 | | 2/2004 | Taha et al. |
| 6,721,306 | B1 | | 4/2004 | Farris et al. |
| 6,747,961 | B1 | | 6/2004 | Ahmed et al. |
| 6,829,477 | B1 | * | 12/2004 | Lu et al. ................... 455/426.1 |
| 6,829,480 | B1 | * | 12/2004 | Hoglund et al. ............ 455/433 |
| 7,046,646 | B2 | * | 5/2006 | Kilgore ...................... 370/331 |
| 2002/0022481 | A1 | * | 2/2002 | Yang .......................... 455/432 |
| 2004/0203780 | A1 | * | 10/2004 | Julka et al. ................. 455/436 |

FOREIGN PATENT DOCUMENTS

EP    1 246 496    10/2002

* cited by examiner

*Primary Examiner*—William Trost
*Assistant Examiner*—Christopher M Brandt
(74) *Attorney, Agent, or Firm*—Robert E. Bushnell, Esq.

(57) ABSTRACT

When a subscriber registered in a first wireless private network system moves to a service area of a second wireless private network system, the roaming service method and system of the wireless private network systems in a multi-zone updates HLR and VLR information of the second wireless private network system and synchronizes the updated information with HLRs and VLRs of other regional wireless private network systems so that the subscriber can be provided with in-plant wired/wireless services in any regional wireless private network systems. When the wireless terminal subscriber registered in the first wireless private network system moves through the wireless private network systems in the multi-zone, the wireless terminal subscriber can be automatically serviced from the wireless private network systems regardless of regions if the wireless terminal subscriber is located in any of the wireless private network system service areas.

17 Claims, 13 Drawing Sheets

FIG. 3

| HLR, VLR DB | |
|---|---|
| MS_Tel[4] | |
| | |
| MS_Min[10].... | |
| Cos | Tenant |
| org_hlr_id | CurRegistedLoc |
| MCC_MNC_LEN | MCC_MNC_O |
| ESNNumber | |
| | |
| Name[16]..... | |
| ⋮ | |
| Public_State | Barring_State |
| pbx_sys_id | PubTEM_Ext |
| PageSYSID | reserved_4 |
| reserved_5 | PwrOn_LocUp |
| PBX_Tel[4] | |
| | |
| mdn[16]..... | |
| imsi[16]..... | |
| reserved_6[20] | |

FIG.13

| Offset | CONTENTS | Size(Byte) | REMARK |
|---|---|---|---|
| 0 | MESSAGE DELIMITER | 1 | 0×01 |
| 1 | MESSAGE TYPE | 1 | 0×0A - SUBSCRIBER INFORMATION ADDITION<br>0×01 - SUBSCRIBER INFORMATION CHANGE<br>0×01 - SUBSCRIBER INFORMATION CANCEL |
| 2 | Req_Ack | 1 | 0×00 - SYNCHRONIZATION REQUEST<br>0×00 - SYNCHRONIZATION REPLY |
| 3 | Self HLR ID | 1 | ITS HLR ID |
| 4 | Opp. HLR ID | 1 | CORRESPONDING HLR ID |
| 5 | Reserved1 | 1 | 0×FF |
| 6 | SYNCHRONIZATION SUBSCRIBER INFORMATION | 152 | CORRESPONDIGN SUBSCRIBER INFORMATION RECORD (SUBSCRIBER INFORMATION ADDED/CANCELED/CHANGED) | ions
ROAMING SERVICE METHOD AND SYSTEM IN MULTI-ZONE PRIVATE WIRELESS NETWORK SYSTEMS

CLAIM OF PRIORITY

This application makes reference to, incorporates the same herein, and claims all benefits accruing under 35 U.S.C. 119 from an application for ROAMING SERVICE SYSTEM AND METHOD BETWEEN PRIVATE WIRELESS NETWORK SYSTEMS IN MULTI-N ZONE earlier filed in the Korean Intellectual Property Office on Nov. 08, 2003 and there duly assigned Serial No. 2003-78893.

BACKGROUND OF THE INVENTION

1. Field of the Invention

The present invention relates to a roaming service method and system of wireless private network systems. More particularly, the present invention relates to a method and system for carrying out a roaming service to wireless private network systems in a multi-zone, by which a subscriber registered in a first wireless private network system can be provided with a call service from a second wireless private network system when moved to a service area of the second wireless private network system.

Herein the term "multi-zone wireless private network system" indicates a network system constituted of same type of wireless private network systems having their own service areas different from one another, in which when a subscriber registered in a first wireless private network system moves out of a service area of the first wireless private network system to visit or roam a service area of a second wireless private network system, the second wireless private network system can provide a call roaming service to the roaming subscriber through cooperation with the first wireless private network system. That is, the respective wireless private network systems located in respective regions of the multi-zone can cooperate with one another, so that the subscriber can be provided with a variety of services from any regional wireless private network system when visiting or roaming the same.

2. Description of the Related Art

In general, wireless private network systems provide services to subscriber terminals registered in their own service areas. When a subscriber terminal registered in a first wireless private network system visits or roams a service area of a second wireless private network system, the subscriber terminal cannot be provided with any service from the wireless private network systems. That is, the subscriber terminal or mobile terminal can be provided with a communication service such as call origination, call receiving and other additional functions only from the first wireless private network system.

In a conventional business communication system of wireless private network systems (e.g., PABX), when a wireless terminal registered in a first wireless private network system moves to a service area of a second wireless private network system, a user manually sets a specific function such as call forwarding or requests such a specific function from a system manager in order to be provided with a roaming service. At present, wireless terminals are increasingly used in a business communication network (e.g., business in-plant wireless network system) since they can be used for communication without restraint in place or time. Such tendency requires an automatic roaming function together with various additional services (e.g., SMS: Short Message Service) based upon the automatic roaming function.

Incorporated by reference herein are U.S. Pat. No. 6,697,621 to Mehmet Taha et al. entitled METHOD AND APPARATUS FOR PROVIDING SERVICES IN A PRIVATE WIRELESS NETWORK which discusses use of a visitor location register (VLR) of a private wireless network that is operable to interrogate multiple home location registers (HLRs) due to detection of a roaming subscriber. The VLR may download one or more subscriber profiles from the multiple HLRs in order to support a variety of services to be offered to the subscriber within the private wireless network. The private wireless network may be embedded within the public wireless network, and the VLR may communicate with both a private network HLR and a public network HLR; U.S. Pat. No. 6,721,306 to Robert D. Farris, et al. entitled PUBLIC WIRELESS/CORDLESS INTERNET GATEWAY which discusses an automatic verification mode, wherein the system communicates with a home location register (HLR) associated with a handset to verify authorization. a wireless gateway system also obtains customer profile information from the HLR and stores that data in a visitor location register (VLR) assigned to the handset. In the preferred embodiment, a central database, accessible via the public packet switched data network, maintains the HLR records; and U.S. Pat. No. 6,016,425 to Cecil H. Bannister entitled HYBRID MULTIZONE CALL DELIVERY SYSTEM which discusses conventional systems, wherein when a roaming portable enters a zone, the portable initiates a registration process. In this registration process the ID and location of the portable device is communicated to a central node to update a Home Location Register (HLR) in a central node. The central node uses the information in its home location register to deliver an incoming call to the portable at the zone where that portable is registered. Bannister's hybrid multizone call delivery system delivers calls to portables by broadcasting from a central node a portable identification number (PIN) and dial-in number (DN) to all the zones in the system. Portables register their presence in zones as they roam throughout the coverage area. When a zone matches a broadcast PIN to a PIN registered therein, a zone controller pages the portable and initiates a call back to the broadcast DN. Upon receipt of the call back, the central node connects the incoming call to the portable through the call back connection. Bannister then teaches it is only necessary to maintain local visitor location register (VLRs) at each zone, and it is not necessary to maintain a home location register (HLR), as is required in conventional systems; and U.S. Pat. No. 6,747,961 to Walid Ahmed et al. entitled MOBILITY MANAGEMENT FOR A MULTIMEDIA MOBILE NETWORK discusses mobility management issues within a packet-based multiaccess mobile communications system, which includes a plurality of mobile user stations and a plurality of network nodes, are provided. Location management techniques include tracking and/or locating mobile stations within the system. The system makes use of home and visiting location registers in which information such as mobile station addresses and/or host names associated with mobile stations are stored.

SUMMARY OF THE INVENTION

It is an object of the present invention to provide a roaming service method and system of wireless private network systems in a multi-zone, which synchronizes Home Location Register (HLR) information of the wireless private network systems in the multi-zone, by which a wireless terminal subscriber registered in a first wireless network system can be automatically provided with a call (data/voice) service and additional services, when moved from its home service area to a service area of a second wireless private network system, based upon the synchronized (i.e., updated) HLR information, even though the subscriber additionally requests his/her location registration or sets any optional functions.

According to an aspect of the invention for achieving the above-noted object, there is provided a synchronization method of subscriber information for a roaming service of wireless private network systems in a multi-zone, the method including the following steps of: (a) initially synchronizing subscriber information of wireless terminals registered in a first wireless private network system with associated wireless private network systems in the multi-zone by updating the subscriber information into subscriber information databases of the associated wireless private network systems via a first network at system initialization; and (b) if it is judged that a wireless terminal registered in the first wireless private network system moved to a service area of a second wireless private network system based upon location information contained in a location registration message received from the wireless terminal, updating, by the second wireless private network system, subscriber information of the wireless terminal into its subscriber information database by re-registering the location information of the wireless terminal to synchronize the location re-registered subscriber information of the wireless terminal with associated wireless private network systems in the multi-zone via the first network. Preferably, the first network includes an IP network, and each of the subscriber information databases of the wireless private network systems includes a Home Location Register (HLR) and a Visitor Location Register (VLR).

Preferably, the initial subscriber information synchronization step (a) comprises: inspecting a synchronization flag of the subscriber information of each wireless terminal registered in the first wireless private network system to judge whether the initial synchronization is necessary; if it is judged that the initial synchronization is necessary, transferring a synchronization-request message for synchronization of the subscriber information of the registered wireless terminal to the first wireless private network systems via the network; and if synchronization-request reply messages informing synchronization completion through update of the subscriber information are received from the associated wireless private network systems, completing the initial subscriber synchronization.

Preferably, the synchronization-request message transferring step includes: inspecting the link status with associated wireless private network systems in the multi-zone; and if it is judged that the link status is normal, transferring the synchronization-request message for at least one having a set synchronization flag of the subscribers registered in its subscriber information database to the associated wireless private network systems via the network.

Preferably, the synchronization-request message is transferred to the wireless private network systems according to home location register identification (ID) for synchronization of all the wireless private network systems in the multi-zone.

The synchronization method of subscriber information may further comprise the following steps of: (c) after the initial subscriber information synchronization step (a), if the subscriber information is modified via a User Interface (UI), updating the subscriber information into the subscriber information databases and setting a flag of the modified subscriber information; (d) transferring a synchronization-request message for subscriber information synchronization with the associated wireless private network systems according to associated wireless private network system IDs via the first network; and (e) if a synchronization-request reply message informing synchronization completion through update of the subscriber information is received from a corresponding associated wireless private network system, resetting the subscriber modification flag to synchronize the modified subscriber information.

Preferably, the synchronization-request message includes at least one selected from a group including message delimiter information, message type information for indicating the subscriber information modification, synchronization-request or reply delimiting information, its HLR ID information, destination (corresponding) HLR ID information and synchronization subscriber information for actual synchronization.

Preferably, the synchronization-request message transferring step (d) comprises: inspecting the subscriber information modification flag to judge whether the synchronization according to the subscriber information modification is necessary; if the synchronization with the associated wireless private network systems is necessary according to the subscriber information modification, inspecting the link status of the associated wireless private network systems in the multi-zone; and if the link status is normal, transferring a synchronization-request message for subscriber information synchronization with the associated wireless private network systems according to associated wireless private network system IDs to the associated wireless private network systems via the first network.

Preferably, the modified subscriber information synchronization inspects the subscriber information modification flag at modification of the subscriber information from the User Interface (UI) or at a predetermined period, and if the modification flag exists, executing the modified subscriber information synchronization of the associated wireless private network systems.

Preferably, the location re-registered subscriber information synchronization step (b) includes: after the initial subscriber information synchronization step (a), if the location registration message is received from the wireless terminal, retrieving a subscriber information database based upon the location information contained in the received location registration message to compare initially registered location information of the wireless terminal with present location information thereof; if the initially registered location information of the wireless terminal is different from the present location information of the wireless terminal as a result of the comparing step, judging that the wireless terminal moved to the service area of the second wireless private network system, re-registrating the location information of the wireless terminal into its own subscriber information database, and updating the subscriber information; and transferring a synchronization-request message for the updated subscriber information to the associated wireless private network systems in the multi-zone via the first network to synchronize subscriber information databases of the associated wireless private network systems together.

Preferably, the subscriber information database synchronization step includes: inspecting a subscriber information modification flag of the location re-registered wireless terminal to judge whether associated system synchronization according to subscriber information modification is necessary; if the associated system synchronization according to subscriber information modification is necessary, inspecting the link status of the associated wireless private network systems in the multi-zone; and if the link status is normal, transferring a synchronization-request message for subscriber information synchronization with the associated wireless private network systems according to associated wireless private network system IDs to the associated wireless private network systems via the first network.

According to another aspect of the invention for achieving the above-noted, there is provided a synchronization method of subscriber information for a roaming service of wireless private network systems in a multi-zone, the method including the following steps of: inspecting a synchronization flag of subscriber information of each registered wireless terminal to judge whether initial subscriber information synchronization of associated wireless private network systems in the multi-zone is necessary; inspecting the link status with the associated wireless private network systems in the multi-zone; if it is judged that the link status is normal, transferring a synchronization-request message for at least one having a set synchronization flag of the subscribers registered in its subscriber information database to the associated wireless private network systems via a network; and if synchronization-request reply messages informing synchronization completion through update of the subscriber information are received from the associated wireless private network systems, completing the initial subscriber information synchronization.

According to further another aspect of the invention for achieving the above-noted, there is provided a synchronization method of subscriber information for a roaming service of wireless private network systems in a multi-zone, which are associated with one another via a network, in a situation that subscriber information initial synchronization is completed at system initialization, the method including the following steps of: if the subscriber information is modified via a User Interface (UI), updating the subscriber information into the subscriber information databases and setting a flag of the modified subscriber information; inspecting the set subscriber information modification flag to judge whether synchronization according to subscriber information modification is necessary; if the synchronization according to subscriber information modification is necessary, inspecting the link status of the associated wireless private network systems in the multi-zone; if it is judged that the link status is normal, transferring a synchronization-request message containing the modified subscriber information for subscriber information synchronization to each associated wireless private network system via the network; and if a synchronization-request reply message informing synchronization completion through update of the subscriber information is received from the associated wireless private network systems, resetting a corresponding subscriber information modification flag to synchronize the modified subscriber information.

According to other aspect of the invention for achieving the above-noted, there is provided a synchronization method of subscriber information for a roaming service of wireless private network systems in a multi-zone, which are associated with one another via a network, in response to location re-registration of wireless terminals in a situation that subscriber information initial synchronization is completed at system initialization, the method including the following steps of: (a) if a location registration message is received from a wireless terminal, retrieving a subscriber information database based upon location information contained in the received location registration message to compare initially registered location information of the wireless terminal with present location information thereof; (b) if the initially registered location information of the wireless terminal is different from the present location information of the wireless terminal as a result of the comparing step, judging that the wireless terminal moved from a service area of other wireless private network system, re-registrating the location information of the wireless terminal into its own subscriber information database, and updating the subscriber information; and (c) transferring a synchronization-request message for the updated subscriber information to the associated wireless private network systems in the multi-zone via the first network to synchronize subscriber information databases of the associated wireless private network systems together.

According to other aspect of the invention for achieving the above-noted, there is provided a synchronization method of subscriber information for a roaming service of wireless private network systems in a multi-zone, the method including the following steps of: (a) at system initialization, transferring subscriber information of registered wireless terminals to associated wireless private network systems in the multi-zone via a first network to initially synchronize subscriber information in subscriber information databases of the respective wireless private network systems; (b) after the initial synchronization step, if it is judged that a wireless terminal registered in a first wireless private network system moved to a service area of a second wireless private network system based upon location information contained in a location registration message received from the wireless terminal, updating, by the second wireless private network system, subscriber information of the wireless terminal into its subscriber information database by re-registrating the location information of the wireless terminal to synchronize the location re-registered subscriber information of the wireless terminal with associated wireless private network systems in the multi-zone via the first network; and (c) if a call-request signal for a counterpart wireless terminal is received from the location re-registered wireless terminal, retrieving the subscriber information database to inspect the present location information of the counterpart wireless terminal, and transferring a call origination-request signal to a wireless private network system corresponding to the present location information of the counterpart wireless terminal via a second network to establish call connection between the location re-registered wireless terminal and the counterpart wireless terminal.

Preferably, the first network is an IP network, and the second network is an Inter-Node Interface (INI) interface leased line connected between private branch exchanges of the respective wireless private networks.

Preferably, the call connected between the location re-registered wireless terminal and a third wireless terminal contains at least one of a voice call and a data call.

The synchronization method of subscriber information may further includes the steps of: (i) if a call-request signal is received via a PBX from the location re-registered wireless terminal, judging whether the call-request signal requests an outward call toward a line telephone connected to a PSTN; and (j) if the call-request signal requests an outward call, connecting a call between the location re-registered wireless terminal and the line telephone.

The synchronization method of subscriber information may further includes the steps of: (k) if a line telephone connected to a PSTN makes a call-request signal for the location re-registered wireless terminal, transferring the call-request signal to a PBX of the first wireless private network system of the location re-registered wireless terminal; (l) locating, by the PBX of the first wireless private network system, the location re-registered wireless terminal via the updated subscriber information of the location re-registered wireless terminal; and (m) if the location re-registered wireless terminal is located, transferring the call-request signal to the second wireless private network system of the service area where the location re-registered wireless terminal roams at present via an INI interface leased line to connect a call between the line telephone and the location re-registered wireless terminal.

According to further another aspect of the invention for achieving the above-noted, there is provided a roaming service system of wireless private network systems in a multi-zone including: means for interfacing a signal for call connection of wireless terminals located in service areas of the respective wireless private network systems in the multi-zone; means for synchronizing subscriber information of wireless terminals with associated private wireless network systems via a network, wherein the synchronization means synchronize subscriber information registered in respective wireless private network systems at initialization of the respective wireless private network systems, subscriber information modified via a User Interface (UI), and location re-registered subscriber information at the movement of a wireless terminal from one service area to another service area of the respective wireless private network system; and means for storing the subscriber information synchronized among the wireless private network systems by the synchronizing means.

The roaming service system may further comprise call-processing means for (a) examining the present location of the wireless terminal from the storage means, when a call-request signal is received from the wireless terminal, to transfer the call-request signal to a wireless private network system of a service area in which the wireless terminal is located at present, and (b) connecting a call to a corresponding wireless terminal when receiving a call-request signal from the interfacing means.

Preferably, the synchronizing means include: a first processor for executing initial synchronization by initializing common information of the respective wireless private network systems and transferring the subscriber information stored in their own storage means at initialization of the respective wireless network systems to the associated wireless private network systems via the network; a second processor for transferring a synchronization-request message containing modified subscriber information, when the subscriber information is modified in operation of the respective wireless private network systems, to the associated wireless private network systems; a third processor for receiving an initial synchronization-request message, an in-operation synchronization-request message and a reply message in response to the synchronization-request message transferred via at least one of second processors of the associated wireless private network systems, the reply message including the subscriber information at initialization and the modified subscriber information in operation; a fourth processor for temporarily storing the message from the third processor according to message type and updating the subscriber information stored in the storage means according to the message type of the temporarily stored message; a fifth processor for transferring a link-check message and judging the link status of the respective wireless private network systems for synchronization of the subscriber information at system initialization or subscriber information modification; and a sixth processor for receiving a link-check message from at least one of fifth processors of the associated wireless private network systems.

Preferably, each of the synchronization-request message and the synchronization-reply message includes at least one selected from a group including message delimiter information, message type information for indicating the subscriber information modification, synchronization-request or reply delimiting information, its HLR ID information, destination (corresponding) HLR ID information and synchronization subscriber information for actual synchronization.

Preferably, the synchronization means execute the system initial synchronization according to the following steps of: (a) inspecting, by the second processor, synchronization flags of the subscriber information of wireless terminals registered in the storage means to judge whether it is necessary to initially synchronize the subscriber information of the associated wireless private network systems in the multi-zone; (b) if it is necessary to initially synchronize the subscriber information, inspecting, by the fifth processor, the link status of the associated wireless private network systems in the multi-zone; and (c) if the link status is normal, transferring, by the second processor, the synchronization-request message for at least one having a set synchronization flag of the wireless terminals registered in the storage means to the associated wireless private network systems via the network.

Preferably, the synchronization means synchronize the modified subscriber information according to the following steps of: (a) if the modified subscriber information is made via the User Interface (UI) after completing the initial synchronization, by the fourth processor, updating the subscriber information stored in the storage means with the modified subscriber information and setting a flag of the modified subscriber information; (b) inspecting, by the second processor, the subscriber information modification flag to judge whether it is necessary to synchronize in response to the subscriber information modification, and if it is judged necessary, by the fifth processor, inspecting the link status of the associated wireless private network systems in the multi-zone; (c) if the link status is normal, transferring the synchronization-request message for the re-registered subscriber information in the storage means to at least one of the wireless private network systems associated with the second processor via the network; and (d) if the third processor receives the reply message about synchronization completion through update of the subscriber information from the associated wireless private network systems, resetting, by the second processor, the subscriber modification flag to complete the synchronization of the modified subscriber information.

Preferably, the synchronization means synchronize the location re-registered subscriber information according to the following steps of: (a) by the fourth processor, updating the subscriber information of the location re-registered wireless terminal into the storage means and setting a flag of location re-registered subscriber information; (b) inspecting, by the second processor, the subscriber information re-registration flag to judge whether synchronization according to the subscriber information re-registration is necessary, and if it is judged that the synchronization is necessary, inspecting, by the fifth processor, the link status with the associated wireless private network systems in the multi-zone; (c) if it is judged that the link status is normal, transferring the synchronization-request message for the location re-registered subscriber information in the storage means to at least one of the wireless private network systems associated with the second processor via the network; and (d) if the third processor receives the reply message about synchronization completion through update of the subscriber information from the associated wireless private network systems, resetting, by the second processor, the subscriber modification flag to complete the synchronization of the modified subscriber information.

According to other aspect of the invention for achieving the above-noted, there is provided a roaming service system of wireless private network systems in a multi-zone including: means for interfacing a signal for call connection of wireless terminals located in service areas of the respective wireless private network systems in the multi-zone; means for synchronizing subscriber information of wireless terminals with associated private wireless network systems via a network, wherein the synchronization means synchronize subscriber information registered in respective wireless private network systems at initialization of the respective wireless private network systems, subscriber information modified via a User Interface (UI), and location re-registered subscriber information at the movement of a wireless terminal from one service area to another service area of the respective wireless private network system; and means for storing the subscriber information synchronized among the wireless private network systems by the synchronizing means; and call-processing means for (a) examining the present location of the wireless terminal from the storage means, when a call-request signal is received from the wireless terminal, to transfer the call-request signal to a wireless private network system of a service area in which the wireless terminal is located at present, and (b) connecting a call to a corresponding wireless terminal when receiving a call-request signal from the interfacing means.

According to yet another aspect of the invention for achieving the above-noted, there is provided a synchronization system of subscriber information for a roaming service of wireless private network systems in a multi-zone, the method including: a first processor for executing initial synchronization by initializing common information of the respective wireless private network systems and transferring the subscriber information stored in their own storage means at initialization of the respective wireless network systems to the associated wireless private network systems via the network; a second processor for transferring a synchronization-request message containing modified subscriber information, when the subscriber information is modified in operation of the respective wireless private network systems, to the associated wireless private network systems; a third processor for receiving an initial synchronization-request message, an in-operation synchronization-request message and a reply message in response to the synchronization-request message transferred via at least one of second processors of the associated wireless private network systems, the reply message including the subscriber information at initialization and the modified subscriber information in operation; a fourth processor for temporarily storing the message from the third processor according to message type and updating the subscriber information stored in the storage means according to the message type of the temporarily stored message; a fifth processor for transferring a link-check message and judging the link status of the respective wireless private network systems for synchronization of the subscriber information at system initialization or subscriber information modification; and a sixth processor for receiving a link-check message from at least one of fifth processors of the associated wireless private network systems.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 3 illustrates a Home Location Register (HLR) or a Visitor Location Register (VLR) database structure in each wireless private network system;

FIG. 13 illustrates a data structure included in a synchronization-request message and a synchronization-request reply message according to the invention.

DETAILED DESCRIPTION OF THE PREFERRED EMBODIMENTS

Hereinafter, a method and system for carrying out a roaming service between wireless private network systems according to preferred embodiment of the present invention will be described in detail with reference to the accompanying drawings.

Figure 1:
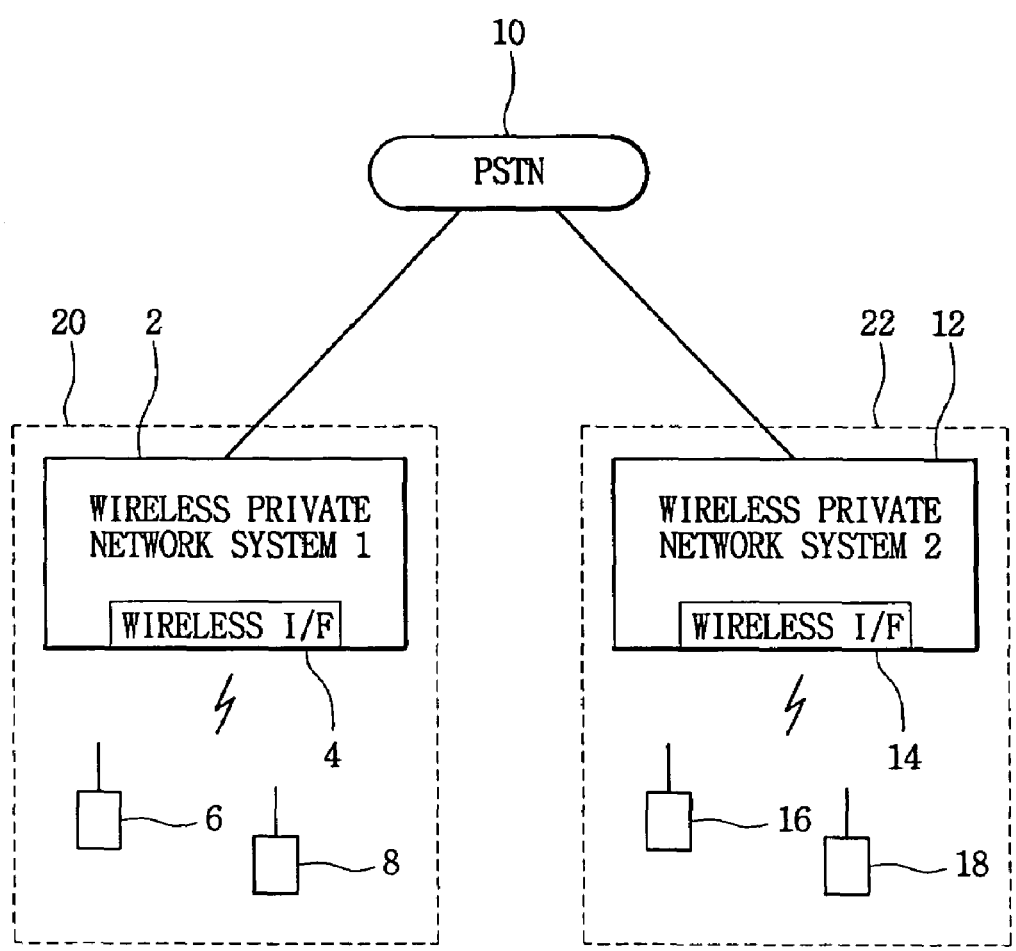
FIG. 1 illustrates a network connection structure between wireless private network systems and a Public Switch Telephone Network (PSTN)

FIG. 1 illustrates a network connection structure between wireless private network systems 2 and 12 and a Public Switch Telephone Network (PSTN) 10. The wireless private network systems 2 and 12 can be connected respectively with the PSTN 10. The wireless private network systems 2 and 12 have wireless interfaces 4 and 14, and provide services exclusively to wireless terminals 6, 8; 16, 18 registered within their own service areas. As a result, when the wireless terminals 16 and 18 registered in the wireless private network system 12 move to a service area 20 of the wireless private network system 2, the wireless terminals 16 and 18 are not provided with any service from the private network system 2. On the other hand, when the wireless terminals 6 and 8 registered to the wireless private network system 2 move to a service area 22 of the wireless private network system 12, the wireless terminals 6 and 8 are not provided with any service from the private network system 12 also.

Figure 2:
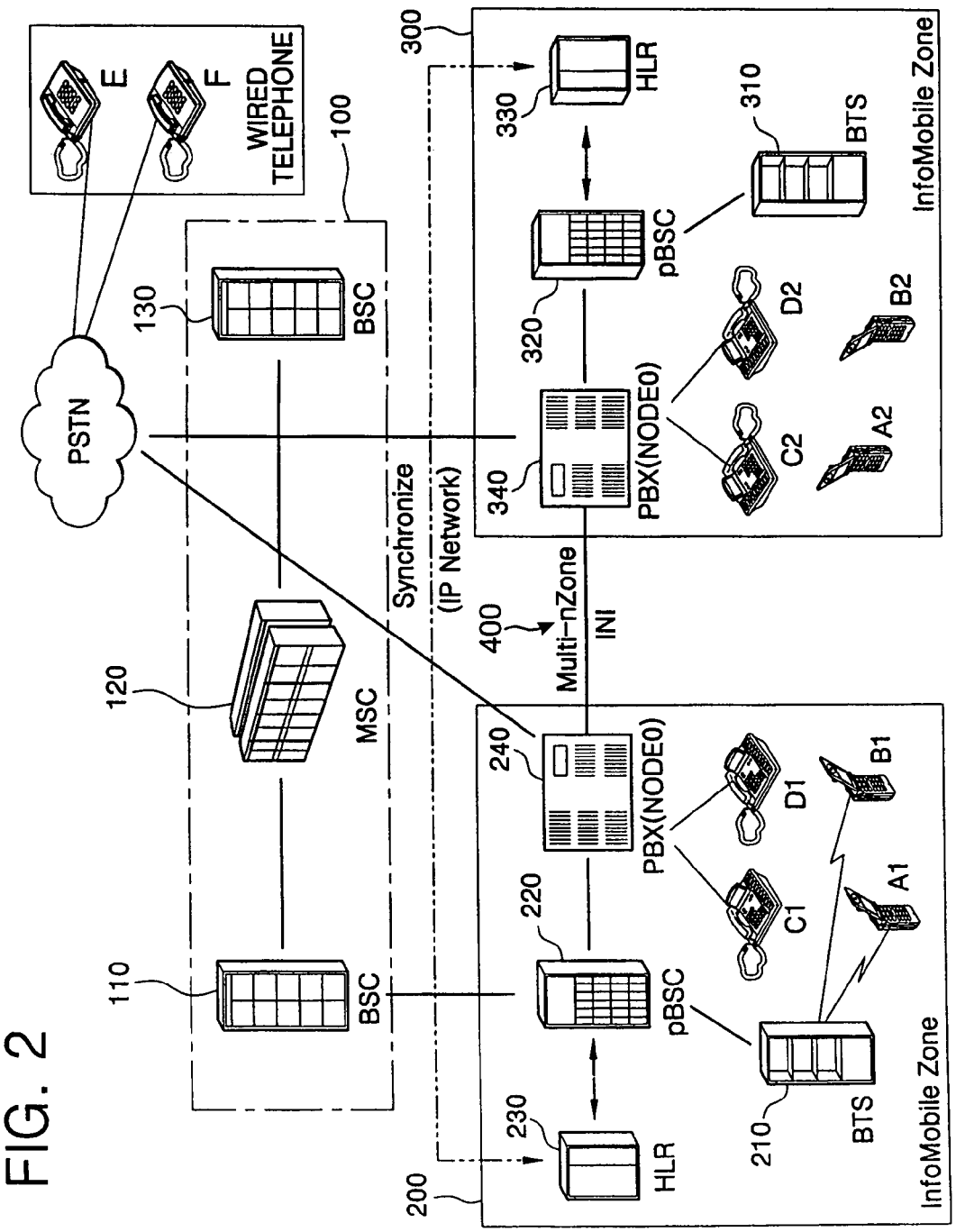
FIG. 2 is a conceptual view of a network connection structure of a multi-zone wireless private network system according to the invention.

FIG. 2 is a conceptual view of a network connection structure of a multi-zone wireless private network system according to the invention.

As shown in FIG. 2, the multi-zone wireless private network system of the invention includes a number of wireless private network systems 200 and 300, which are located in different regions to have their own service areas, and a public mobile communication network 100 connected with both the wireless private network systems 200 and 300. While FIG. 2 illustrates only the wireless private network systems 200 and 300 for two regions, it is to be understood that the wireless private network systems 200 and 300 can be connected with a number of wireless private network systems located in more regions. That is, while only two wireless private network systems located in two regions are illustrated in FIG. 2, the multi-zone wireless private network system can be applied to N number of wireless private network systems located in N number of regions.

In the regional wireless private network systems 200 and 300 located in the respective regions to have their own service areas, the wireless private network system 200 includes a number of wireless terminals A1 and B1 registered in the system 200, a Base Transceiver Station (BTS) 210, a private Base Station Controller (pBSC) 220, extension telephones C1 and D1, a Home Location Register (HLR) 230 and a Private Branch eXchange (PBX) 240. Also, the wireless private network system 300 includes a number of wireless terminals A2 and B2 registered in the system 300, a BTS 310, a pBSC 320, a HLR 330, a PBX 340 and extension telephones C2 and D2.

Further, the public mobile communication network 100 includes BSCs 110 and 130 and a Mobile Switch Center (MSC) 120, in which the BSC 110 of the mobile communication network 100 is connected with the HLR 230 and the pBSC 220 of the wireless private network system 200, and the BSC 130 of the mobile communication network 100 is connected with the HLR 330 and the pBSC 320 of the wireless private network system 300.

While it has been described for illustrative purposes that the wireless private network systems 200 and 300 are connected with the public mobile communication network 100, it will be apparent to those skilled in the art that the wireless private network systems 200 and 300 can be connected with other wireless communication networks.

Further, the PBX 240 of the wireless private network system 200 and the PBX 340 of the wireless private network system 300 are connected together via an Inter-Node Interface (INI) leased line (for example a T1 line) 400 in order to interface call signals for audio or data communication between wireless terminals which are registered respectively in the wireless private network system 200 and 300. Herein a detailed interfacing technique related with the INI leased line (Ti) will not be described in detail as TI interfacing is well known in the art. A preferred interfacing technique, however, can be found disclosed in Korean Laid-Open Patent Application Serial No.10-1998-0012065, filed on Apr. 06, 1998 by the assignee of this application.

While it has been described for illustrative purposes that the PBXs 240 and 340 of the wireless private network system 200 and 300 are connected together via the INI leased line 400, the PBXs 240 and 340 may be connected via other means such as an IP network, a PSTN and other available networks. So, it is to be understood that the scope of the invention is not limited by the INI leased line illustrated in the above embodiment but shall be defined by the accompanying claims.

Both the HLRs 230 and 330 of the wireless private network systems 200 and 300 located in their respective regions are connected to an IP network in order to mutually synchronize (or share) subscriber information for a roaming service between the regional wireless private network systems. Connecting the HLRs 230 and 330 together via the IP network is only an illustrative example, but the HLRs 230 and 330 can be connected via other networks instead of the IP network.

The HLRs 230 and 330 in the wireless private network systems 200 and 300 function as databases to register locations of subscribers and store subscriber information. Each of of the pBSC 220 and 320 include Visitor Location Registers (VLRs (not shown)) which function as a databases to temporarily store subscriber information of wireless terminals visiting the service area of the pertinent wireless private network system 200 or 300.

Subscriber information stored in the HLRs (and VLRs) of the regional wireless private network systems 200 and 300 is mutually synchronized at system initialization, at a change/addition/cancel of subscriber information or at a call request via the IP network, so that when a wireless terminal registered in a first regional wireless private network system visits or roams a service area of a second regional wireless private network system, the roaming wireless terminal can be provided with a call service and other additional services from the second regional wireless private network system based upon subscriber information stored in the HLR and the VLR of the second regional wireless private network system. Herein a method of synchronizing subscriber information of the HLRs 230 and 330 (and VLRs) of the wireless private network systems 200 and 300 will be described in detail later.

Hereinafter a system and method for carrying out a roaming service between wireless private network systems of the invention will be described in detail with reference to the appended drawings.

In order to execute the roaming service between the wireless private network systems, it is necessary to mutually synchronize subscriber information stored in the HLRs of the respective systems at system initialization. First of all, a synchronization process of subscriber information at system initialization will be described as follows.

FIG. 3 illustrates an HLR or VLR database structure in each wireless private network system.

As shown in FIG. 3, in a wireless private network system (200 or 300) of the invention, a registration information structure of a terminal is constructed and operated separate from a PSTN.

The HLR database is constructed in a private Base Station Manager (pBSM) for managing the wireless private network system and the VLR database is constructed in a pBSC so that the HLR and VLR databases are constantly synchronized together to have same information.

In this circumstance, a wireless terminal periodically transfers terminal information such as MIN, ESN and IMSI on location registration messages to its wireless private network system, so that the wireless private network system can update Paging System ID (PageSYSID) in the VLR and HLR databases based upon the terminal information to determine whether the radio terminal is located within its service area.

In the HLR or VLR database structure shown in FIG. 3, MS_Tel indicates an extension number of the radio terminal, MS_Min indicates telephone number information of the radio terminal, Cos indicates a service level of each subscriber, Tenant indicates number information of an imaginary switching unit, org_hlr_id indicates a Call Manager (CM) ID in which a wireless private network system subscriber is initially registered, MCC_MNC_LEN indicates a system code, MCC_MNC_0 indicates a state code and PageSYSID indicates a CM ID in which location registration is made. In this database structure, any new information is compared with present information to update information in response to movement of the wireless terminal.

For example, when the terminal A1 registered in Region 1 of the wireless private network system 200 moves from Region 1 to Region 2 of the wireless private network system 300, the terminal A1 transfers its information such as MIN, ESN and IMSI on a System Parameter Message or Registration Message toward the BTS 310 in Region 2.

The BTS 310 in Region 2 transfers the information of the terminal A1 to the pBSC 320, which in turn retrieves a database based upon the MIN (or ESN or IMSI) of the wireless terminal A1. If the registered CM ID of the terminal A1 is different from the CM ID of the service area (or Region 2) where the terminal A1 is currently located, the pBSC 320 judges that the terminal A1 moved to the service area of the pBSC 320 and updates the wireless terminal information in the VLR and HLR databases.

Because the terminal A1 transfers its information on an Origination Message in the case of calling or on a Page Response Message in the case of call-receiving, the pBSC 320 also updates the location registration information of the terminal A1.

In order to implement the roaming service of the invention, subscriber information is to be synchronized between the HLRs 230 and 330 and the VLRs of the respective wireless private network systems 200 and 300. Synchronization of the subscriber information is necessary in three major situations.

That is, the subscriber information is synchronized between the HLRs and the VLRs of the respective wireless private network systems when (a) the respective wireless private network system is initialized, (b) the subscriber information is added, changed or canceled via a User Interface (UI), and (c) the subscriber information is changed in response to call request from a terminal roaming out of its registered service area.

A process for executing such an HLR synchronization process will be described with reference to FIG. 4.

Figure 4:
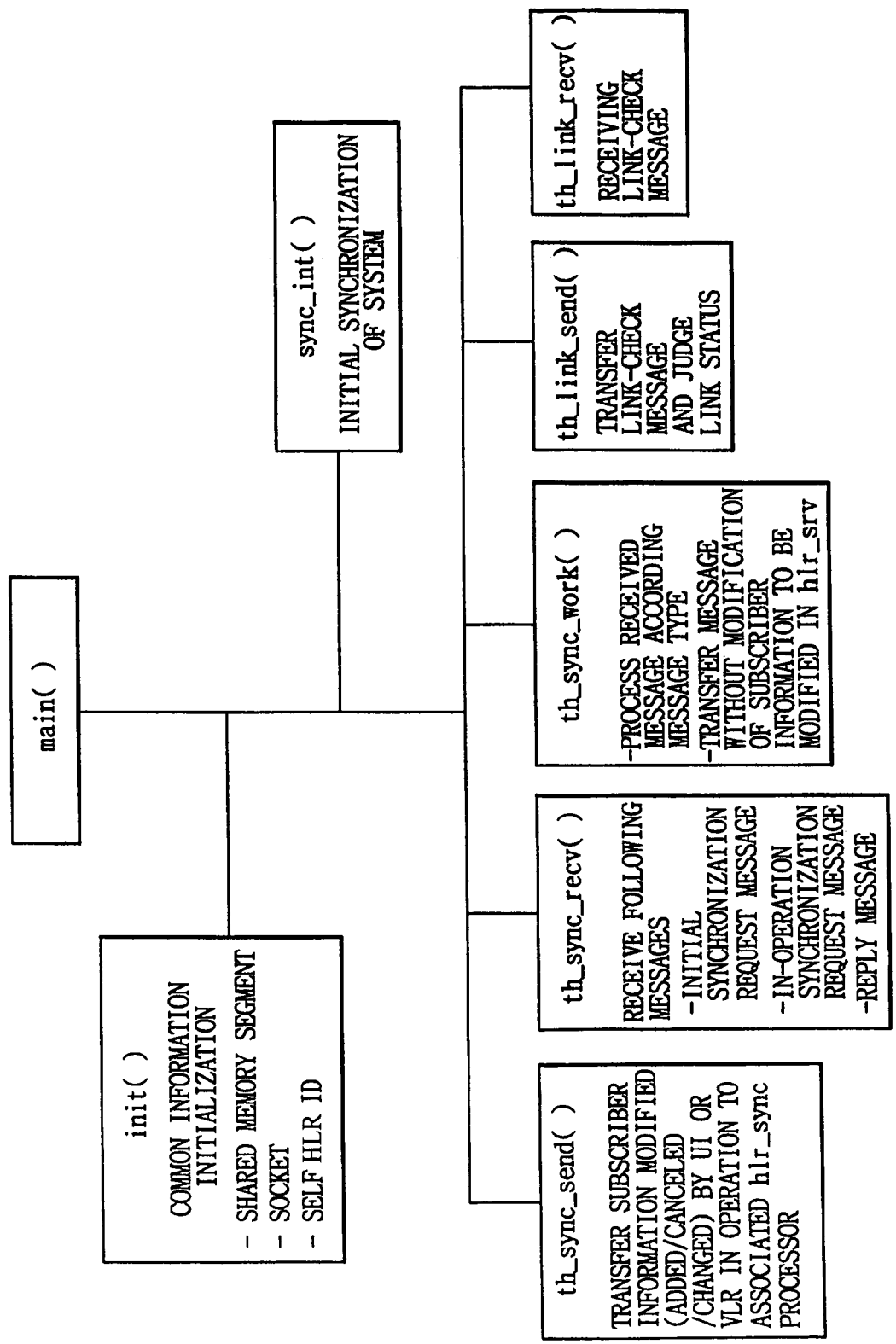
FIG. 4 illustrates an HLR synchronization process of the invention.

As shown in FIG. 4, the HLR synchronization process main( ) may include a number of threads such as init( ) thread, sync_init( ) thread, th_sync_send( ) thread, th_sync_recv( ) thread, th_sync_work( ) thread, th_link_send( ) thread and th_link_recv( ) thread.

The init( ) thread is executed to set up the system, that is, to initialize common information of the respective wireless private network systems, common memory segments, a socket and HLR ID.

The sync_init( ) thread functions to execute synchronize subscriber information of the HLR at initialization of the system, that is, to transfer the subscriber information stored in its HLR database toward HLRs of other regional wireless private network systems via the IP network.

When any subscriber information is changed, added or canceled via the User Interface (UI) or VLR during system operation, the th_sync_send( ) thread serves to transfer the changed/added/canceled information toward the th_sync_recv( ) threads of the HLRs in other associated regional wireless private network systems via the IP network.

The th_sync_recv( ) thread functions to receive initialization-request messages transferred from the th_sync_send( ) threads of the HLRs of other regional wireless private network systems, in-operation synchronization-request messages (i.e., synchronization-request messages during operation), synchronization-reply messages in response to synchronization-request messages and subscriber information (including subscriber information at initial synchronization and subscriber information changed in operation).

The th_sync_work( ) thread processes messages received via the th_sync_recv( ) thread based upon message types and transfer the received messages without modification of subscriber information so that the subscriber information can be modified via the hlr_srv.

The th_link_recv( ) thread transfers a link-check message to inspect the link status between regional wireless private network systems for synchronization of subscriber information at system initialization or change/cancel/addition of subscriber information, and judges the link status.

The th_link_send( ) thread serves to receive link check messages transferred from th_link send ( ) threads in HLRs of other associated regional wireless private network systems.

The above structure of the HLR synchronization process was disclosed as an embodiment for realizing the invention. It is to be understood that the scope of protection of the invention is not event limited thereby but may extend to all such process structures as may incorporate the principle of the invention.

The operation of above threads for synchronization will be described in detail with reference to the appended drawings.

Figure 5:
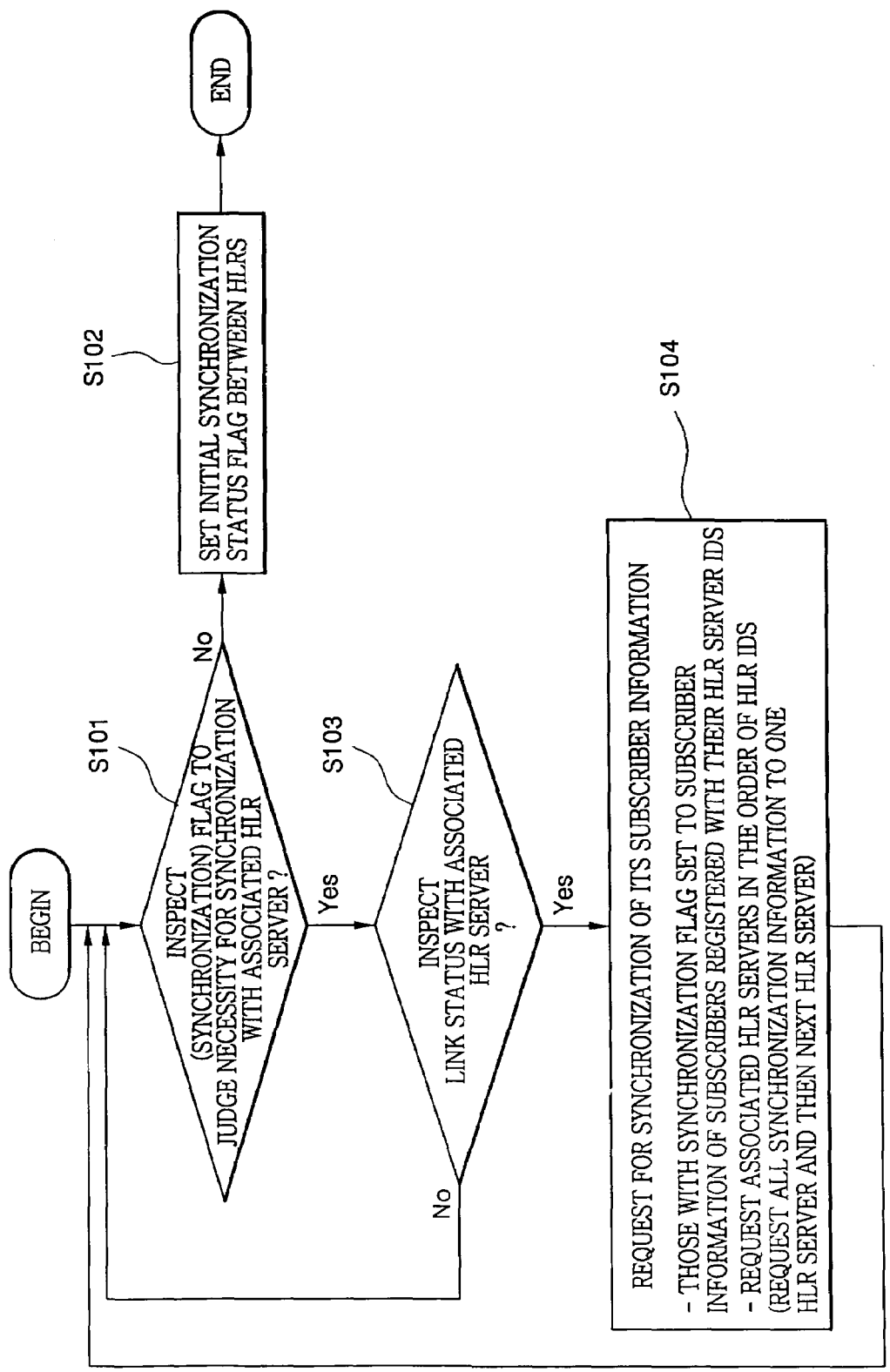
FIG. 5 illustrates a process flowchart of the sync_init( ) thread in the HLR synchronization process shown in FIG. 4.

FIG. 5 illustrates a process flowchart of the sync_init( ) thread in the HLR synchronization process shown in FIG. 4.

As shown in FIG. 5, in step S101, the sync_init( ) thread inspects synchronization flags in HLRs of associated wireless private network systems at the time of system initialization to judge whether HLR synchronization is necessary.

If it is not necessary to inspect the synchronization flag, that is, the initial synchronization flag was inspected already, the sync_init( ) thread sets an initial HLR synchronization status flag in step S102.

If it is necessary to inspect the synchronization flag, the sync_init( ) thread inspects the link status with the associated HLRs to judge whether the link status is normal in step S103. That is, the sync_init( ) thread transfers a link-check message via the th_link_send( ) thread toward the th_link_recv( ) thread of the HLRs of the associated regional wireless private network systems to inspect the link status in response to a reply message.

In step S104, if the link status with the associated HLRs is normal, the sync_init( ) thread requests the associated HLRs for synchronization with its subscriber information so that subscribers registered with their HLR IDs are synchronized in the order of the HLR IDs if their synchronized flags are set in the subscriber information. Herein the sync_init( ) thread requests one HLR for all synchronization information and then a next HLR for all synchronization information. Further, the HLR information can be simultaneously updated for each subscriber ID.

That is, the sync_init( ) thread is executed first and for only one time at operation of the HLR synchronization process shown in FIG. 4, and other threads cannot be executed before completion of the sync_init( ) thread.

The subscriber information cannot be added, canceled or modified via the User Interface (UI) during processing the sync_init( ) thread, and the th_sync_recv( ) thread replies to the associated HLRs for the subscriber information requested for synchronization. This process will be described later.

Now description will be made about a process of the th_sync_send( ) thread functioning to synchronize subscriber information which is added, canceled or changed via the User Interface (UI) after initialization.

Figure 6:
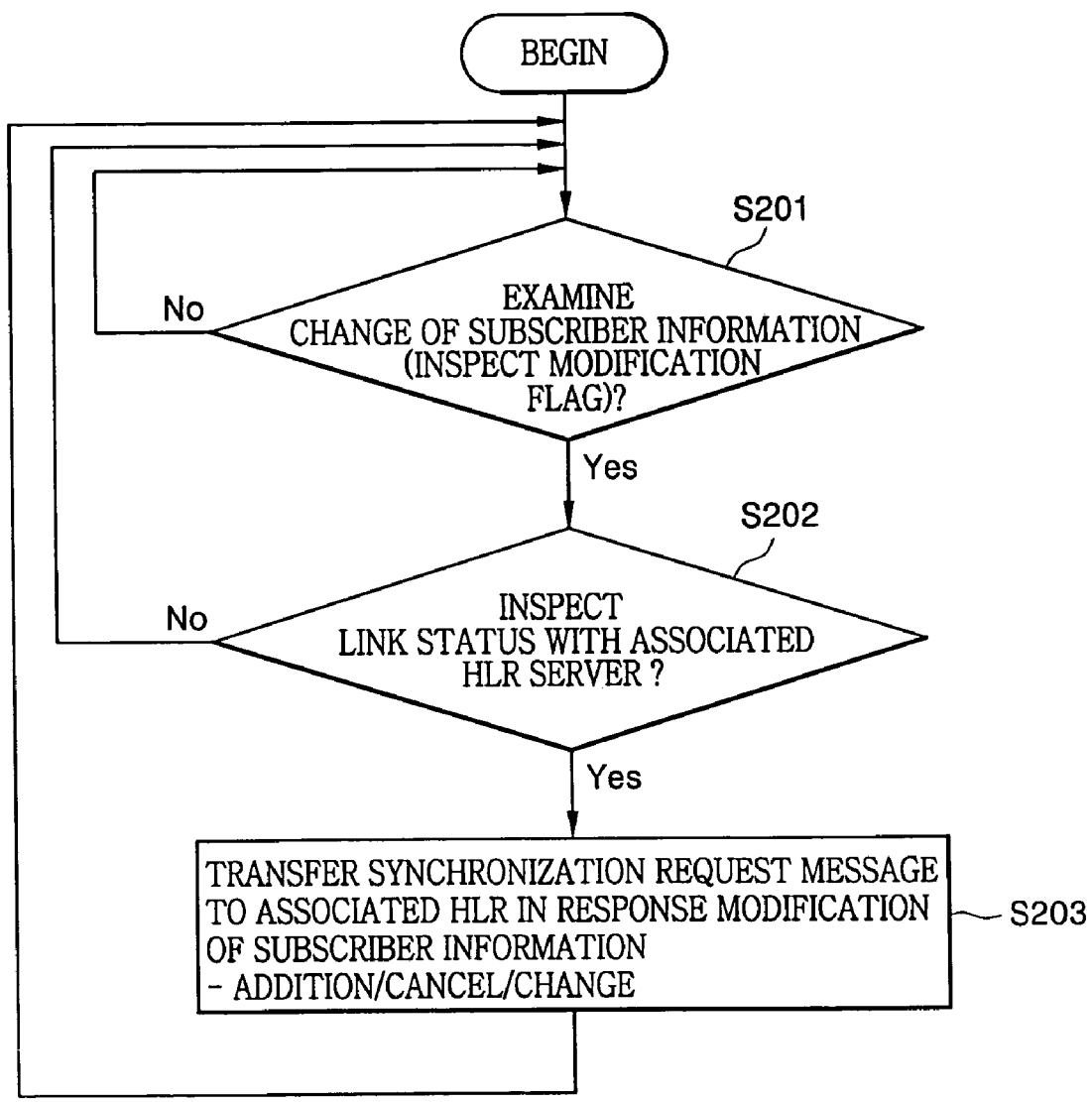
FIG. 6 is a process flowchart of the th_sync_send( ) thread in the HLR synchronization process of the invention.

FIG. 6 is a process flowchart of the th_sync_send( ) thread in the HLR synchronization process of the invention.

As shown in FIG. 6, the th_sync_send( ) thread inspects a modification flag for subscriber information to judge whether the subscriber information is changed in step S201. That is, it is judged whether a request message for change/cancel/addition of subscriber information is received via the User Interface (UI).

If the request message for change/cancel/addition of the subscriber information is received via the User Interface (UI), the th_link_send( ) thread inspects the link status related with the associated HLRs in step S202.

If it is judged that the link status with the associated HLRs is fine, the th_sync_send( ) thread transfers a synchronization-request message to the associated HLRs based upon of the modified subscriber information in step S203. The transferred synchronization-request message contains the subscriber information which is requested from the User Interface (UI) to be changed/canceled/added.

As a result, the th_sync_send( ) thread synchronizes the added/canceled/changed subscriber information after initial synchronization, in which synchronization is performed by periodically inspecting a modification flag for the entire subscriber information. In this circumstance, the synchronization-request message to the associated HLRs is replied via the th_sync_recv( ) thread.

Hereinafter the operation of the th_sync_send( ) thread will be described with reference to FIG. 7.

Figure 7:
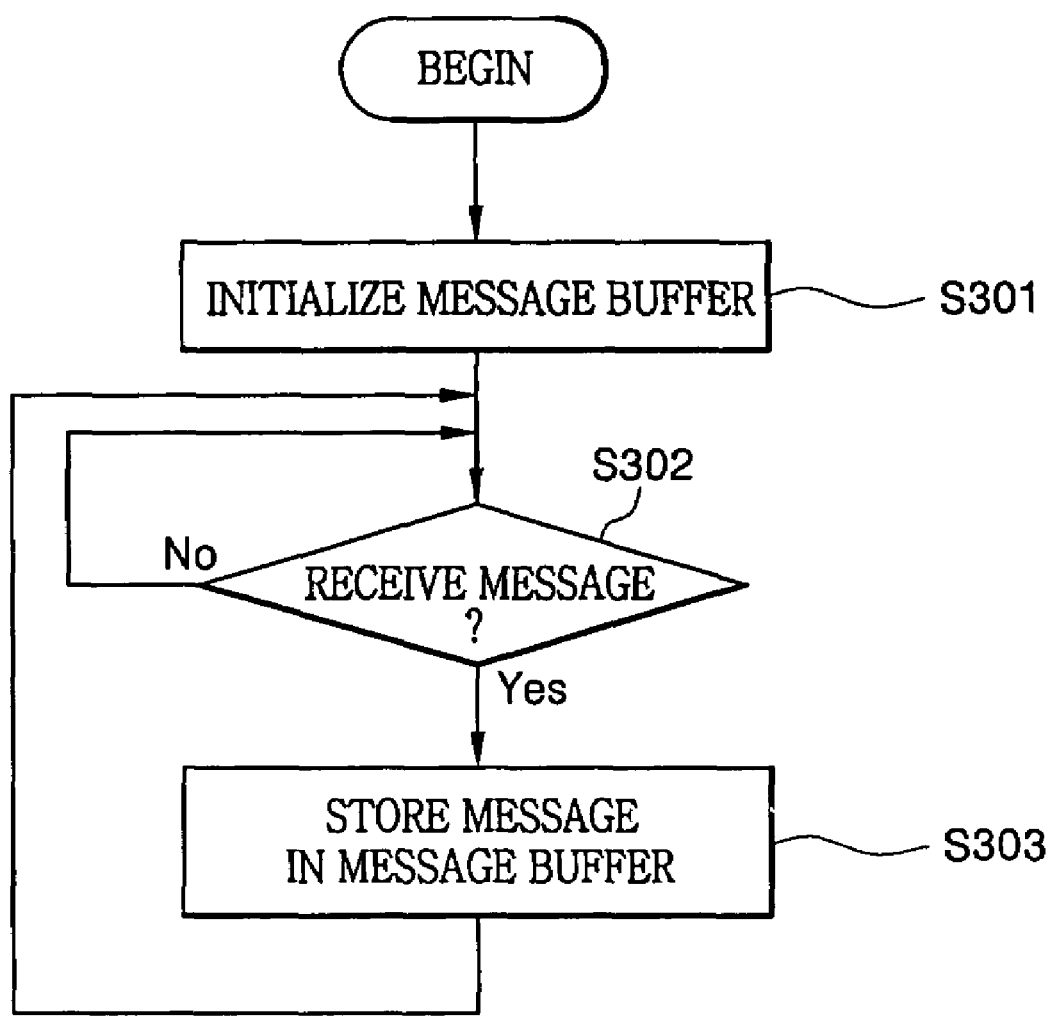
FIG. 7 illustrates a process flowchart the operation of the th_sync_send( ) thread in the HLR synchronization process of the invention.

FIG. 7 illustrates a process flowchart of the th_sync_send( ) thread in the HLR synchronization process according to the invention.

As shown in FIG. 7, as a first step, a message buffer is initialized in step S301.

When the message buffer is initialized, the HLR processor judges whether a synchronization message is received from the sync_init( ) thread and the th_sync_send( ) thread of an HLR of an associated wireless private network system in response to the synchronization-request message transferred from the sync_init( ) thread and the th_sync_send( ) thread of its HLR in step S302.

If it is judged that the synchronization message is received from the sync_init( ) thread and the th_sync_send( ) thread of the HLR of the associated wireless private network system, the received synchronization message is stored in the initialized message buffer in step S303. That is, the th_sync_send( ) thread stores synchronization messages in order in the message buffer so as to prevent message loss while processing the same, in which actual synchronization is executed via the th_sync_work( ) thread.

Hereinafter a synchronization process of the th_sync_work( ) thread for performing subscriber information synchronization between the HLRs of the multi-zone wireless private network systems using the synchronization messages stored in the message buffer via the th_sync_recv( ) thread will described in brief with reference to FIG. 8.

Figure 8:
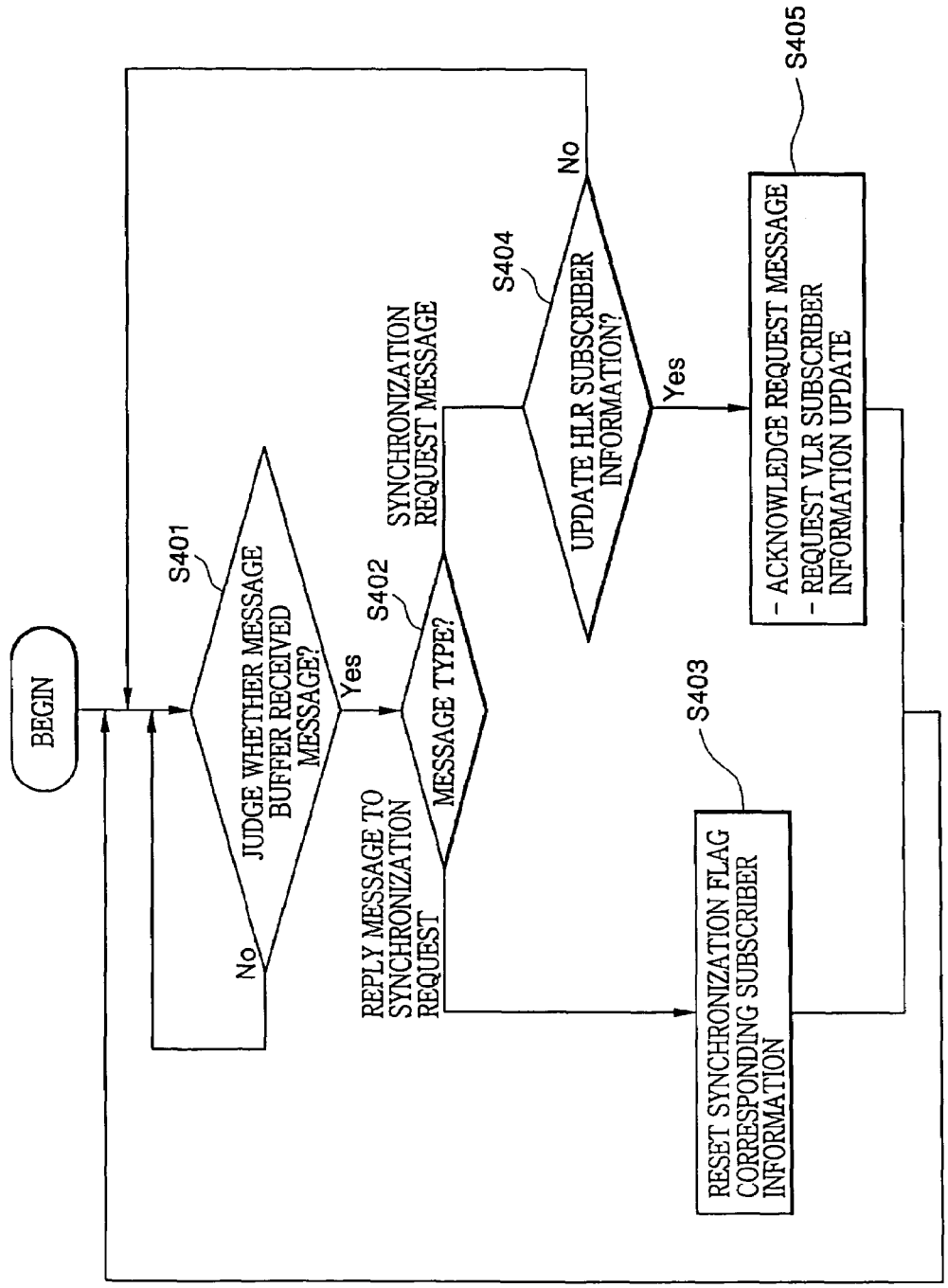
FIG. 8 illustrates a process flowchart of the th_sync_work( ) thread in the HLR synchronization process of the invention.

FIG. 8 illustrates a process flowchart of the th_sync_work( ) thread in the HLR synchronization process according to the invention.

As shown in FIG. 8, it is judged whether a synchronization message is received/stored in the message buffer via the th_sync_recv( ) thread in step S401.

If it is judged that the synchronization message is received/stored in the message buffer, the HLR processor judges the type of the message in step S402.

If it is judged that the message stored in the message buffer is a reply message in response to the synchronization-request message, the synchronization flag of corresponding subscriber information is reset based upon the received message in step S403. That is, if the message is a reply message in response to the synchronization-request message transferred from the sync_init( ) thread or the th_sync_send( ) thread of its HLR synchronization processor, the synchronization flag of corresponding subscriber information in use for synchronization is reset to complete inspection on the synchronization flag of a corresponding subscriber.

However, in step S402, if the message stored in the message buffer is a synchronization-request message transferred from the sync_init( ) thread or the th_sync_send( ) thread in an HLR synchronization process of an associated wireless private network system, the th_sync_work( ) thread inspects the synchronization message to judge whether it is necessary to update HLR subscriber information in step S404.

If the synchronization message is a synchronization-request message where update is necessary, the th_sync_work( ) thread transfers a synchronization-request reply message to the th_sync_recv( ) thread of an HLR synchronization process in a corresponding wireless private network system in response to the synchronization-request message, and modifies HLR subscriber information corresponding to the received synchronization-request message in step S405.

Further, in step S405, upon completion of modifying the HLR subscriber information, the th_sync_work( ) thread requests the VLR of the pBSC in its wireless private network system for subscriber information modification to execute synchronization between the HLR and the VLR.

Figure 9:
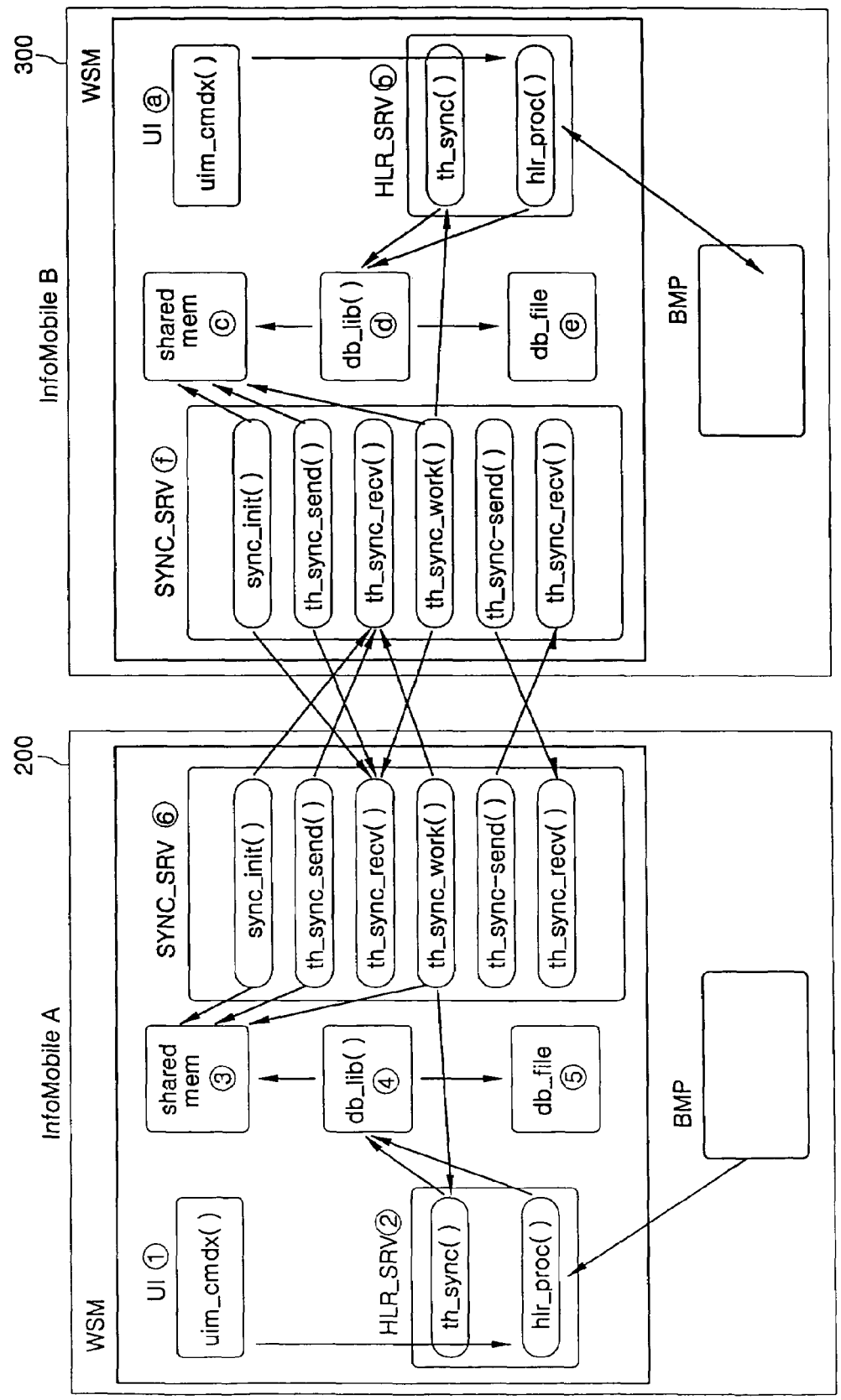
FIG. 9 illustrates a synchronization process for a roaming service between wireless private network systems of the invention.

Hereinafter, with reference to FIGS. 9 to 12, it will be described stepwise about signal flows in synchronization processes such as actual initial synchronization, synchronization at subscriber information modification from the User Interface (UI) and synchronization at location re-registration of a wireless terminal using threads of the above HLR synchronization process. In describing the respective synchronization steps, the wireless private network systems in the multi-zone will be indicated as InfoMobile A, InfoMobile B for the sake of clarity. In FIG. 9, WSMs designate devices for managing calls of InfoMobile A, InfoMoble B, and include the HLRs 230 and 330 in regional InfoMobile A 200, regional InfoMobile B 300 as shown in FIG. 2.

FIG. 9 illustrates a synchronization process for a roaming service between the wireless private network systems of the invention, in which InfoMobile A and InfoMobile B communicate messages via the IP network.

As shown in FIG. 9, describing the signal flow in initial synchronization, the sync_init( ) thread of a synchronization processor SYNC_SRV (6) of InfoMobile A 200 transfers an initial synchronization-request message to a synchronization processor SYNC_SRV (f) of InfoMobile B 300 via the IP network, the th_sync_recv( ) thread of the synchronization processor SYNC_SRV (f) of InfoMobile B 300 receives the initial synchronization-request message.

When the initial synchronization-request message is received, the th_sync_recv( ) thread temporarily stores the received initial synchronization-request message in the message buffer, and the th_sync_work( ) thread of the synchronization processor SYNC_SRV (f) of InfoMobile B 300 (hereinafter will be referred to as "InfoMobile B synchronization processor SYNC_SRV (f)") updates InfoMobile A subscriber information in response to the temporarily stored synchronization-request message and then transfers a synchronization-request reply message to the synchronization processor SYNC_SRV (6) of InfoMobile A 200 (hereinafter will be referred to as "InfoMobile A synchronization processor SYNC_SRV (6)") via the IP network.

Upon receiving the reply message from the th_sync_work( ) thread of the InfoMobile B synchronization processor SYNC_SRV (f), the th_sync_recv( ) thread of the InfoMobile A synchronization processor SYNC_SRV (6) temporarily stores the reply message into the message buffer, and the th_sync_work( ) thread of the InfoMobile A synchronization processor SYNC_SRV (6) resets an initial synchronization flag of corresponding subscriber information of shared mem(3) and db_file (5) in response to the reply message stored in the message buffer.

In the meantime, the th_sync_work( ) thread of the InfoMobile B synchronization processor SYNC_SRV (f) reads, in order, synchronization-request messages (including subscriber information of a number of subscribers registered in InfoMobile A 200) stored in the message buffer via the th_sync_recv( ) thread to provide a synchronization-request message to the th_sync( ) thread of HLR_SRV (b). Then, the th_sync( ) thread of HLR_SRV (b) updates HLR subscriber information stored in shared_mem (c) and db_file (e) with the subscriber information from the th_sync_work( ) thread via a database library db_lib (d).

The system initial synchronization process as above will be described in brief with reference to a process flowchart in FIG. 10.

Figure 10:
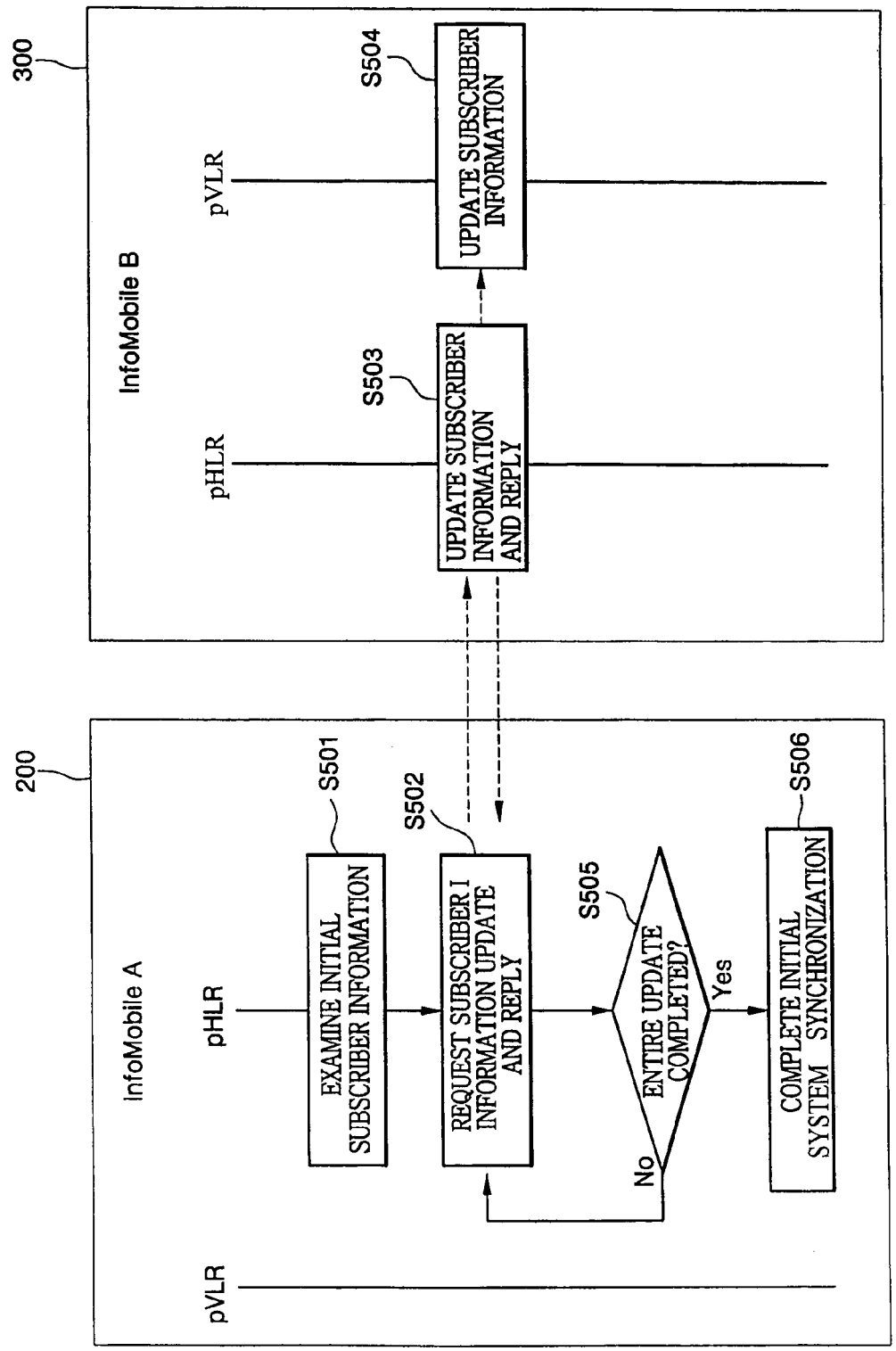
FIG. 10 illustrates a flowchart of an initial system synchronization process between pHLRs of associated wireless private network systems.

FIG. 10 illustrates a flowchart of an initial system synchronization process between pHLRs of associated wireless private network systems.

Referring FIG. 10, where wireless terminal subscribers are registered in their regional InfoMobile systems, when InfoMobile A 200 sends a synchronization-request message to InfoMobile B 300, the pHLR of InfoMobile A 200 examines initially registered subscriber information in step S501.

In step S502, the pHLR of InfoMobile A 200 transfers the initial synchronization-request message including subscriber information for update of subscriber information registered in the pHLR of InfoMobile A 200 toward the pHLR of InfoMobile B 300 via the IP network.

The pHLR of InfoMobile B 300 updates its database with the subscriber information contained in the initial synchronization-request message from the pHLR of InfoMobile A 200, and transmits a reply message for the synchronization-request message to InfoMobile A 200 in step S503. After updating its subscriber information, the pHLR of InfoMobile B 300 also provides subscriber information to the pVLR in pBSC to update its subscriber information in step S504.

In response to the reply message from the pHLR of InfoMobile B 300, the pHLR of InfoMobile A 200 resets a synchronization flag of corresponding subscriber information in step S502.

Then, the pHLR of InfoMobile A 200 judges whether all subscriber information is completely updated in step S505, and if all subscriber information is completely updated (or synchronized), completes the initial system synchronization process in step S506.

Then, the synchronization process for subscriber information modification (e.g., addition/cancel/change) from the User Interface (UI) will be described with reference to FIG. 9.

First, subscriber information is modified through a uim_cdmx( ) thread of the User Interface (UI) (1) of InfoMobile A 200, the modified subscriber information is sent to a hlr_proc( ) thread of HLR server (2) (hereinafter will be referred to as "HLR_SVR (2)").

The hlr_proc( ) thread sends subscriber information modified from the User Interface (UI) (1) to db_lib (4) to modify corresponding subscriber information of shared mem (3) and db_file (5).

Upon modification of corresponding subscriber information, the th_sync_send( ) thread of the InfoMobile A 200 synchronization processor SYNC_SVR(6) transfers a synchronization-request message containing modified subscriber information to the InfoMobile B synchronization processor SYNC_SRV (f) via the IP network, the synchronization-request message containing modified subscriber information is received by the th_sync_recv( ) thread of the InfoMobile B synchronization processor SYNC_SRV (f).

Upon receiving the synchronization-request message containing modified subscriber information, the th_sync_recv( ) thread of the InfoMobile B synchronization processor SYNC_SRV (f) temporarily stores the synchronization-request message in the message buffer. The th_sync_work( ) thread of the InfoMobile B synchronization processor SYNC_SRV (f) updates subscriber information according to the synchronization-request message temporarily stored in the message buffer, and transfers a reply message to the InfoMobile A 200 synchronization processor SYNC_SRV (6) via the IP network.

Upon receiving the reply message transferred from the th_sync_work( ) thread of the InfoMobile B synchronization processor SYNC_SRV (f), the th_sync_recv( ) thread of the InfoMobile A 200 synchronization processor SYNC_SRV (6) temporarily stores the reply message in the message buffer. The th_sync_work( ) thread of the InfoMobile A 200 synchronization processor SYNC_SRV (6) resets a modification synchronization flag of corresponding subscriber information of shared mem (3) and db_file (5) in response to the reply message stored in the message buffer.

In the meantime, the th_sync_work( ) thread of the InfoMobile B synchronization processor SYNC_SRV (f) reads in order synchronization-request messages of modified subscriber information, which is stored in the message buffer through the th_sync_recv( ) thread, and sends the synchronization-request message to the th_sync( ) thread of an HLR server(b) (hereinafter will be referred to as "HLR_SVR (b)"). Then, the th_sync( ) thread of HLR_SVR (b) updates corresponding HLR subscriber information stored in shared mem (c) and db_file (e) using modified subscriber information received from the th_sync_work( ) thread via the database library db_lib (d).

Where the subscriber information is modified via the User Interface (UI) as above, the synchronization process of the subscriber information is not carried out till the initial system synchronization process is performed.

Figure 11:
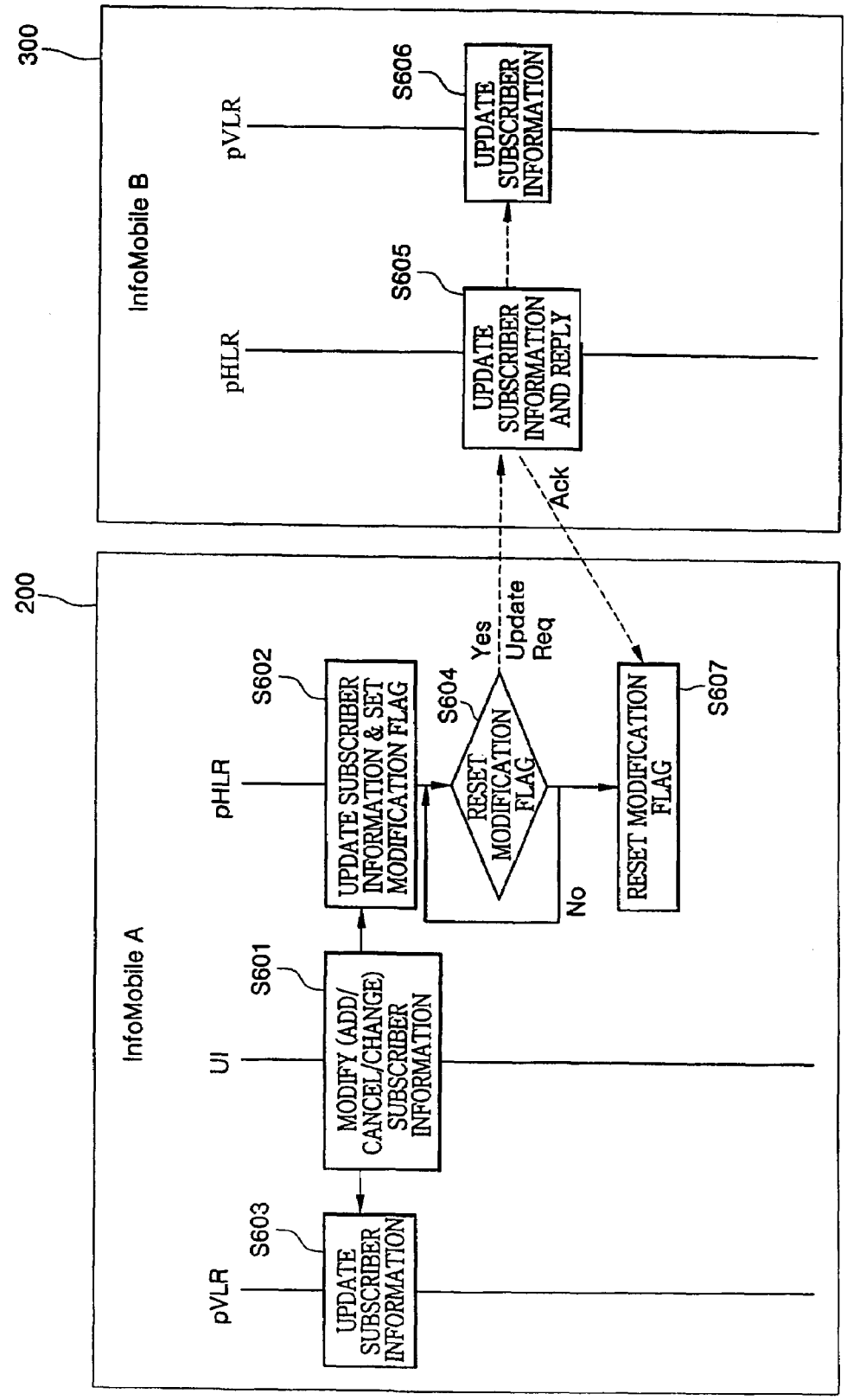
FIG. 11 illustrates a flowchart of a synchronization process of modified subscriber information between pHLRs of associated wireless private network systems.

In case of subscriber information modification from the User Interface (UI) as above, the synchronization flow of modified subscriber information will be described in brief with reference to a process flowchart as shown in FIG. 11.

FIG. 11 illustrates a flowchart of a synchronization process of modified subscriber information between private home location registers (pHLRs) of associated wireless private network systems.

As shown in FIG. 11, if subscriber information is modified (e.g., changed/canceled/added) from the User Interface (UI) of InfoMobile A 200 in step S601, modified subscriber information is updated to corresponding subscriber information in the pVLR of the pBSC and the pHLR of InfoMobile A 200 in step S602 and step S603.

Then, the pHLR of InfoMobile A 200 inspects a modification synchronization flag of subscriber information in the database, and sends a synchronization-request message for update of modified subscriber information to the pHLR of associated InfoMobile B 300 via the IP network in step S604.

The pHLR of InfoMobile B 300 updates corresponding subscriber information in its database in response to the synchronization-request message of modified subscriber information from the pHLR of InfoMobile A 200, and transfers a reply message for the synchronization-request message to InfoMobile A 200 in step S605. Upon updating subscriber information, the pHLR of InfoMobile B 300 provides subscriber information, which is updated for synchronization of information, to the pVLR in the pBSC so that the pVLR also updates subscriber information in step S606.

In response to the reply message from the pHLR of InfoMobile B 300, the pHLR of InfoMobile A 200 resets a modification flag of corresponding subscriber information in step S607.

In the meantime, when a wireless terminal registered in a service area of a first regional InfoMobile system moves to a service area of a second regional InfoMobile system, the synchronization process of subscriber information of the roaming wireless terminal is substantially equal to the synchronization process in subscriber information modification as described with reference to FIG. 9. Thus, the synchronization process will be briefly described with reference to a flowchart as shown in FIG. 12.

Figure 12:
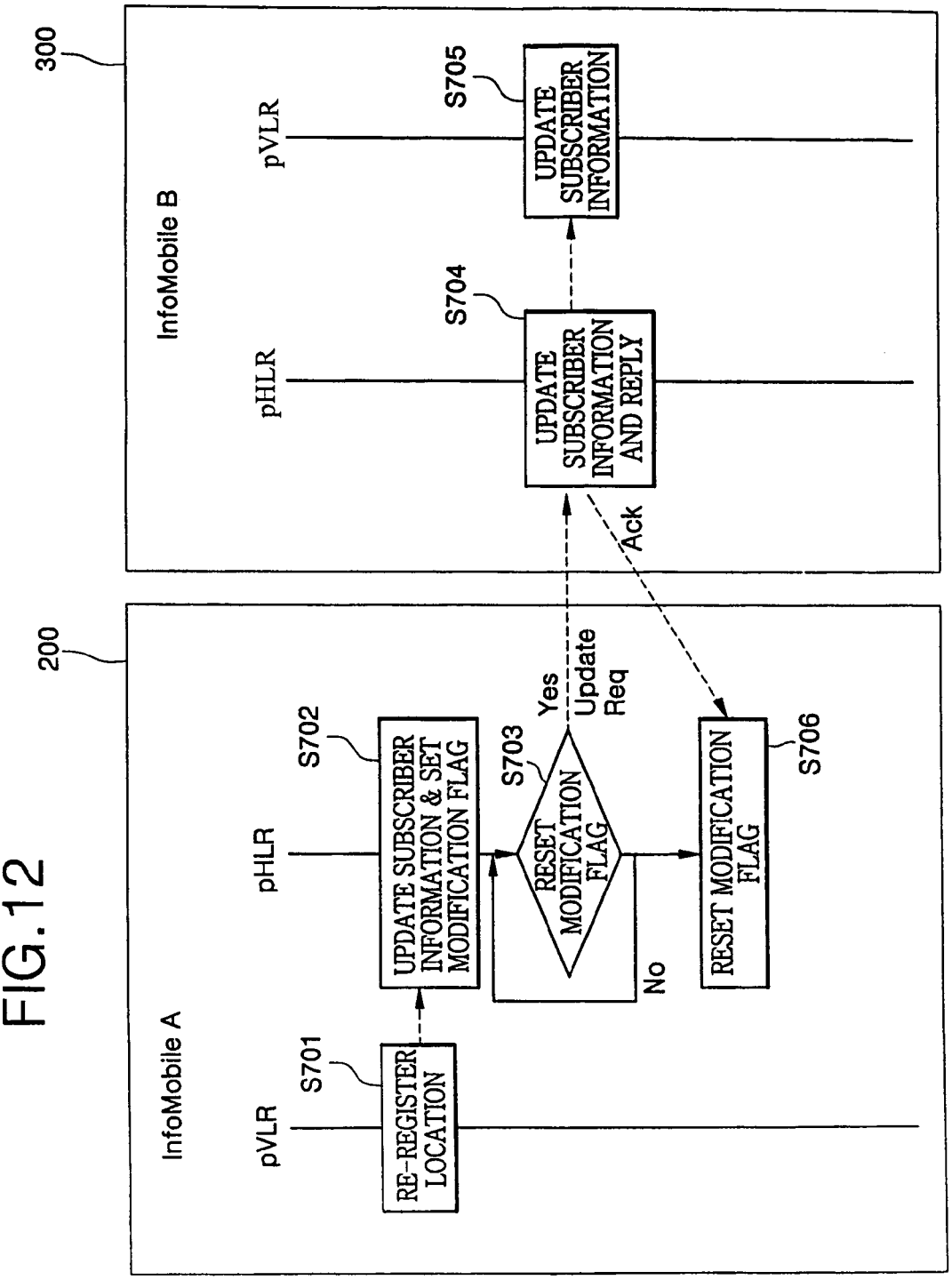
FIG. 12 illustrates a flowchart of the synchronization process of subscriber information between pHLRs of first and second regional associated InfoMobile systems in a situation that a mobile terminal registered in the first regional InfoMobile system roams the second regional InfoMobile system.

FIG. 12 illustrates a flowchart of the synchronization process of subscriber information between pHLRs of first and second regional associated InfoMobile systems in a situation that a mobile terminal registered in the first regional InfoMobile system roams the second regional InfoMobile system.

When a wireless terminal registered in InfoMobile B 300 moved to a service area of InfoMobile A 200, the wireless terminal transfers a location registration message via the BTS of InfoMobile A 200 to the pBSC of InfoMobile A 200 in order to request call service from InfoMobile A 200.

The pBSC of InfoMobile A 200 re-registers location information of the wireless terminal stored in its pVLR via the location registration message received from the wireless terminal in step S701, and sends subscriber information with changed location information of the wireless terminal to the corresponding pHLR for update of corresponding subscriber information. Then, the pHLR updates corresponding subscriber information according to the changed subscriber information received from the pVLR (pBSC) and sets a modification flag of corresponding subscriber information in step S702.

The pHLR of InfoMobile A 200 inspects the modification flag of the subscriber information and transfers a synchronization-request message for update of the subscriber information with the changed location information to the pHLR of InfoMobile B 300 via the IP network in step S703.

The pHLR of InfoMobile B 300 updates corresponding subscriber information stored in its database in response to the synchronization-request message of the changed subscriber information of the wireless terminal received from the pHLR of InfoMobile A 200, and transfers a reply message for the synchronization-request message to InfoMobile A 200 in step S704. Then, the pHLR of InfoMobile B 300 updates its subscriber information, and sends the subscriber information, which is updated for subscriber information synchronization, to the pVLR of the pBSC in order to re-register the subscriber information or location information of the wireless terminal in step S705.

The pHLR of InfoMobile A 200 resets the modification flag of corresponding subscriber information, in step S706, in response to the reply message received from the pHLR of InfoMobile B 300 via the IP network to complete the subscriber information synchronization process for the wireless terminal with the modified location information so that the roaming wireless terminal can be provided with various call services such as branch call and extension call.

The synchronization-request message and the reply message used in the above synchronization process between the pHLRs associated via the IP network have an illustrative message structure as follows, and those data contained in the messages are reported in FIG. 13.

```
typedef struct
{
unsigned char msg__from;         //0x00:hlr__srv, 0x01:other hlr__sync
unsigned char msg__type;         //0x0a:Add, 0x0c:Change, 0x0d:Delete
unsigned char req__ack;          //0x00:Req., 0x01:Ack
unsigned char src__hlr__id;      //self hlr id
unsigned char dst__hlr__id;      //dest hlr id (0-3)
unsigned char rsvd1;             //reserved for resolution
unsigned short hlr__index;       //hlr index
unsigned char data[sizeof(MSC__VLR__DB__BUF)];
                                 //hlr__db__data(152 bytes)
unsigned char rsvd[40];          //reserved
} SYNC__MSG;                     //Total 200 bytes
```

Each the synchronization-request message and the reply message may include message delimiter information, message type information, synchronization-request or reply delimiting information, its HLR ID information, destination (corresponding) HLR ID information, synchronization subscriber information for actual synchronization and so on. Herein, message type information notifies message types such as addition/change/cancel of the subscriber information.

Hereinafter certain embodiments of a roaming service process between multi-zone InfoMobile systems of the invention will be described with reference to FIG. 2. In this case, the operation of branch call service to line or wireless terminals in a service area of a corresponding InfoMobile system will not be described since it is substantially same as those of the prior art.

First Embodiment

A first embodiment of the invention is a roaming service process for a wireless terminal B1 which moves from a first region, in which the wireless terminal B1 is registered, to a second region.

With subscriber information being initially synchronized between HLRs of regional InfoMobile systems, if the mobile terminal B1 registered in a first regional InfoMobile system 200 moves to a service area of a second regional InfoMobile system 300, the roaming wireless terminal transfers a location registration message to the pBSC 320 via the BTS 310 of the second regional InfoMobile system 300.

The pBSC 320 analyzes the location registration message from the wireless terminal B1 to compare the present location of the wireless terminal B1 with location information of the wireless terminal registered in the VLR (not shown) of the pBSC 320 and the HLR 330.

If the present location information of the wireless terminal B1 is different from the registered location information, the pBSC 320 changes the subscriber registration information (i.e., location information) in its VLR and in HLR 330.

Where the subscriber information of the VLR and HLR 330 of the InfoMobile system 300 is changed as above, the regional associated InfoMobile systems 200 and 300 execute HLR synchronization to synchronize the changed subscriber information. Herein the HLR synchronization process for the subscriber information modification according to re-registration of location information will not be explained again since it was described in detail with reference to FIGS. 9-12. In this case, the HLR synchronization of the systems is executed via the IP network.

After finishing re-registration of modified location information of the HLRs and the VLRs through HLR synchronization of the associated InfoMobile systems, if a wireless terminal A1 registered in the first InfoMobile system 200 and located in Region 1 (i.e., the service area of InfoMobile system 200) makes a call-request message toward the wireless terminal B1 located in Region 2 (i.e., the service area of InfoMobile 300), the call-request message is transferred to the pBSC 220 via the BTS 210 of the InfoMobile system 200.

The pBSC 220 confirms the location information of the wireless terminal B1 via its corresponding VLR, and based upon the confirmed location information of the wireless terminal B1, requests the InfoMobile system 300 covering Region 2 for call origination.

That is, the pBSC 220 of the InfoMobile system 200 confirms the present location information of the mobile terminal B1 via its VLR, and sends the call-request message of the wireless terminal A1 in Region 1 to the PBX 240 because the present location information of the wireless terminal B1 is modified to Region 2 through the above synchronization process.

Upon receiving the call-request message of the wireless terminal A1 from the pBSC 220, the PBX 240 transfers the call-request message to the PBX 340 of the InfoMobile system 300 covering Region 2.

In response to the call-request message from the InfoMobile system 200, the PBX 340 transfers the call-request message via the pBSC 320 and the BTS 310 to the wireless terminal B1, which moved to the service area of the InfoMobile system 300 (or Region 2), in order to enable conversation between the wireless terminal A1 located in Region 1 and the wireless terminal B1 now located in Region 2.

Second Embodiment

A second embodiment of the invention provides a roaming service process between a wireless terminal B2 registered in Region 2 and a wireless terminal B1 which moved to Region 2, with reference to FIG. 2.

First, when the wireless terminal B1 registered in the InfoMobile system 200 in Region 1 moves to Region 2 or the service area of InfoMobile system 300, the roaming wireless terminal B1 transfers a location registration message to the pBSC 320 via the BTS 310 of the second regional InfoMobile system 300 (or Region 2 InfoMobile system 300).

The pBSC 320 analyzes the location registration message from the wireless terminal B1 to compare the present location of the wireless terminal B1 with location information of wireless terminal B1 registered in its VLR and in HLR 330.

If the registered location information of the wireless terminal B1 is different from the present location information of wireless terminal B1, the pBSC 320 changes subscriber registration information (location information) of its VLR and the HLR 330.

Where the subscriber information of the VLR and the HLR 330 of the InfoMobile system 300 is modified, the InfoMobile system 300 executes HLR synchronization with the InfoMobile system 100 to synchronize the modified subscriber information. Herein the HLR synchronization process for the modified subscriber information according to re-registration or modification of location registration will not be explained again since it was described above with reference to FIGS. 9-12. The HLR synchronization of the systems is carried out via the IP network.

After re-registration of location information of the HLRs and the VLRs through the HLR synchronization of the associated InfoMobile systems according to location re-registration of the wireless terminal B1, when the wireless terminal B2 registered in the InfoMobile system 300 and currently located in Region 2 makes a call-request message toward the wireless terminal B1 which moved from Region 1 to Region 2, call service is executed between the wireless terminals B1 and B2 in the same manner as a call service executed between the wireless terminals A2 and B2 located in Region 2.

As a result, the second embodiment is provided to execute call service between a first wireless terminal registered in Region 1 and a second wireless terminal registered in Region 2 in a situation where the first wireless terminal roams Region 2. That is, where the first wireless terminal registered in Region 1 visits Region 2, the roaming first wireless terminal transfers a location registration message to the pBSC 320 of the Region 2 InfoMobile system 300 so that the VLR and the HLR 330 of the Region 2 InfoMobile system 300 modify the subscriber registration information and the modified subscriber registration information is synchronized between the HLRs of all of the associated regional InfoMobile systems. Then, the first and second wireless terminals can be provided with a call service in the same manner as a call service executed between wireless terminals originally registered and located in Region 2 InfoMobile system 300.

Third Embodiment

A roaming service process according to a third embodiment of the invention provides a branch call service between a wireless terminal B1 registered in the Region 1 InfoMobile system 200 and a line telephone connected to a PSTN in a situation where the wireless terminal B1 visits Region 2 InfoMobile system 300.

In a situation where the wireless terminal B1 registered in Region 1, as shown in FIG. 2, visits Region 2, a call origination process from the wireless terminal B1 roaming Region 2 to the line telephone connection to PSTN will be described first.

In a situation where the wireless terminal B1 registered in the Region 1 InfoMobile system 200 shown in FIG. 2 visits the service area of the Region 2 InfoMobile system 300, the wireless terminal B1 transfers a location registration message to the pBSC 320 via the BTS 310 of the Region 2 InfoMobile system 300.

The pBSC 320 analyzes the location registration message from the wireless terminal B1 to compare the present location of the wireless terminal B1 with location information of the wireless terminal B1 registered in its VLR and in HLR 330.

If the present location information of the wireless terminal B1 is different from the registered location information, the pBSC 320 changes or modifies the subscriber information (or location information) of the wireless terminal B1 in the VLR and the HLR 330.

When the subscriber information in the VLR and HLR 330 of the InfoMobile system 300 is modified as above, an HLR synchronization process is executed to synchronize the modified subscriber information between the InfoMobile system 300 and the associated InfoMobile system 200.

Herein the HLR synchronization process for subscriber information modification will not be explained again since it was described in detail with reference to FIGS. 9 and 12. The HLR synchronization of the systems is carried out via the IP network.

After re-registration of location information of the HLRs and the VLRs via the HLR synchronization of the associated InfoMobile systems, if the wireless terminal B1 roaming Region 2 of the InfoMobile system 300 makes a call-request message toward a line telephone E connected to the PSTN, the BTS 310 of the InfoMobile system 300 sends the call-request message from the wireless terminal B1 to the pBSC 320.

The pBSC 320 judges whether the call-request message of the wireless terminal B1 received from the BTS 310 is an external or internal call. In this case, a BTMR in the pBSC 320 executes this judgment even though it is not shown in the drawings.

If the BTMR of the pBSC 320 judges that the call-request message is an external call, that is, the call-request message toward the line telephone E, the pBSC 320 sends the call-request message to the PBX 340.

Then, the PBX 340 connects a call to the line telephone E via the PSTN in response to the call-request message of the wireless terminal B1.

In short, when the wireless terminal B1 initially registered in the Region 1 InfoMobile system 200 visits Region 2, the subscriber information of the wireless terminal B1 including its location information is synchronized in the VLRs and the HLRs of the regional InfoMobile systems so that a call service can be carried out in the same fashion that a regional InfoMobile system provides call connection service to a wireless terminal originally registered in its service area.

Now it will be described about a process in a situation that a line telephone E connected to the PSTN makes a call-request signal for the wireless terminal B1 which moved to Region 2 after the synchronization process of the subscriber information between the VLRs and the HLRs of the Info-Mobile systems as set forth above.

At a call request from the line telephone E connected with the PSTN to the wireless terminal B1, a call request signal is sent to the PBX 240 of the Region 1 wireless private network system 200 via the PSTN. Even though the wireless terminal B1 is located in Region 2, the call request signal is transferred to the PBX 240 of the Region 1 wireless private network system 200 because the PSTN recognizes that the wireless terminal B1 is registered in the Region 1 wireless private network system 200. That is, the subscriber information (e.g., the location information of the wireless terminal) is not shared with the PSTN.

The PBX 240 of the wireless private network system 200 receives the call-request signal from the line telephone transformed via the PSTN, and determines the present location of the wireless terminal B1 via VLR information of the HLR 230 and the pBSC 220 which are periodically updated.

Upon determining the present location of the wireless terminal B1, the pBSC 220 of the wireless private network system 200 provides the call-request signal to the PBX 240. The PBX 240 of the wireless private network system 200 transfers the call-request signal via the INI leased line 400 to the PBX 340 of the wireless private network system 300 where the wireless terminal B1 is currently located.

In response to the call-request signal from the PBX 240 of the wireless private network system 200, the PBX 340 of the wireless private network system 300 forms a conversation channel with the wireless terminal B1 in Region 2 via the pBSC 320 and the BTS 310 to establish call connection.

As a result, according to the roaming service method and system between the wireless private network systems of the invention, when a service subscriber registered in a regional InfoMobile system moves to another InfoMobile zone in a multi-zone, the service subscriber can be automatically provided with in-plant wireless call receiving/origination services in a corresponding area without any additional option setting. This can be realized because the pBSC achieves the location information of the wireless terminal via the HLR-to-HLR synchronization and the VLR-to-HLR synchronization of the HLR DB information which is updated through the location registration of the wireless terminal. The pBSC uses the location information of the wireless terminal to convert the call to the corresponding InfoMobile system in order to automatically support the roaming service.

Although the embodiments of the roaming service of the present invention have been illustrated about the voice call, it will be apparent to a person of ordinary skill in the art that the present invention can be applied to provide a roaming service for data calls via the system-to-system HLR synchronization as well as other additional services (e.g., SMS) based upon the roaming service.

As set forth above, when a subscriber registered in a first wireless private network system moves to a service area of a second wireless private network system, the roaming service method and system of the wireless private network systems in a multi-zone of the present invention updates HLR and VLR information of the second wireless private network system and synchronizes the updated information with HLRs and VLRs of other regional wireless private network systems so that the subscriber can be provided with in-plant wired/wireless services in any regional wireless private network systems. That is, when the wireless terminal subscriber registered in the first wireless private network system moves through the wireless private network systems in the multi-zone, the wireless terminal subscriber can be automatically serviced from the wireless private network systems regardless of regions if the wireless terminal subscriber is located in any of the wireless private network system service areas. For example, when a wireless private network system subscriber moves from Region 1 to Region 2, if both of Regions 1 and 2 are provided with wireless private network systems in a multi-zone, the subscriber can be provided with an in-plant wireless service from the Region 2 wireless private network system as in Region 1 without additional subscriber registration request or option setting.

What is claimed is:

1. A synchronization method of subscriber information for a roaming service of wireless private network systems in a multi-zone, the method comprising steps of:
    (a) performing initial system synchronization by initially synchronizing subscriber information of wireless terminals registered in each wireless private network system with associated wireless private network systems in the multi-zone at system initialization by updating the subscriber information in their respective subscriber information databases and into subscriber information databases of the associated wireless private network systems via a first network; and
    (b) if it is judged that a wireless terminal registered in a first wireless private network system moved to a service area of a second wireless private network system based upon location information contained in a location registration message received from the wireless terminal, updating, by the second wireless private network system, subscriber information of the wireless terminal into its subscriber information database by re-registrating the location information of the wireless terminal to synchronize the location re-registered subscriber information of the wireless terminal with associated wireless private network systems in the multi-zone via the first network, wherein the initial system synchronization step (a) comprises steps of:
        inspecting a synchronization flag of the subscriber information of each wireless terminal registered in the each wireless private network system to judge whether initial synchronization is necessary;
        if it is judged that the initial synchronization is necessary, transferring a synchronization-request message for synchronization of the subscriber information of the registered wireless terminal to each of the associated wireless private network systems via the network; and
        if synchronization-request reply messages informing synchronization completion through update of the subscriber information are received from the associated wireless private network systems, completing the initial system synchronization.

2. The method according to claim 1, wherein the first network includes an IP (Internet Protocol) network.

3. The method according to claim 1, wherein each of the subscriber information databases of each of the wireless private network systems includes a Home Location Register (HLR) and a Visitor Location Register (VLR).

4. The method according to claim 1, wherein the synchronization-request message transferring step comprises steps of:
    inspecting a link status with the associated wireless private network systems in the multi-zone; and
    if it is judged that the link status is normal, transferring the synchronization-request message for at least one of the subscribers registered in its subscriber information database having a set synchronization flag to the associated wireless private network systems via the network.

5. The method according to claim 4, wherein the synchronization-request message is transferred to the wireless private network systems, in order, according to home location register identification (HLR ID) for each respective wireless private network system, for synchronization of all the wireless private network systems.

6. A synchronization method of subscriber information for a roaming service of wireless private network systems in a multi-zone, the method comprising steps of:
    (a) performing initial system synchronization by initially synchronizing subscriber information of wireless terminals registered in each wireless private network system with associated wireless private network systems in the multi-zone at system initialization by updating the subscriber information in their respective subscriber information databases and into subscriber information databases of the associated wireless private network systems via a first network;
    (b) if it is judged that a wireless terminal registered in a first wireless private network system moved to a service area of a second wireless private network system based upon location information contained in a location registration message received from the wireless terminal, updating, by the second wireless private network system, subscriber information of the wireless terminal into its subscriber information database by re-registrating the location information of the wireless terminal to synchronize the location re-registered subscriber information of the wireless terminal with associated wireless private network systems in the multi-zone via the first network;
    (c) after the initial system synchronization step (a), if the subscriber information is modified via a User Interface (UI), updating the subscriber information into the subscriber information databases and setting a modification flag of the modified subscriber information;
    (d) transferring a synchronization-request message for subscriber information synchronization with the associated wireless private network systems according to associated wireless private network home location register identifications (HLR IDs) via the first network; and
    (e) if a synchronization-request reply message informing synchronization completion through update of the subscriber information is received from a corresponding associated wireless private network system, resetting the modification flag to synchronize the modified subscriber information.

7. The method according to claim 6, wherein the synchronization-request message transferring step (d) comprises steps of:
    inspecting the subscriber information modification flag to judge whether the synchronization according to the subscriber information modification is necessary;
    if the synchronization with the associated wireless private network systems is necessary according to the subscriber information modification, inspecting the link status of the associated wireless private network systems in the multi-zone; and
    if the link status is normal, transferring a synchronization-request message for subscriber information synchronization with the associated wireless private network systems according to the associated wireless private network system IDs to the associated wireless private network systems via the first network.

8. The method according to claim 6, wherein the modified subscriber information synchronization inspects the subscriber information modification flag at modification of the subscriber information from the User Interface (UI) or at a predetermined period, and if the modification flag exists, executing the modified subscriber information synchronization of the associated wireless private network systems.

9. A synchronization method of subscriber information for a roaming service of wireless private network systems in a multi-zone, the method comprising steps of:
- (a) performing initial system synchronization by initially synchronizing subscriber information of wireless terminals registered in each wireless private network system with associated wireless private network systems in the multi-zone at system initialization by updating the subscriber information in their respective subscriber information databases and into subscriber information databases of the associated wireless private network systems via a first network; and
- (b) if it is judged that a wireless terminal registered in a first wireless private network system moved to a service area of a second wireless private network system based upon location information contained in a location registration message received from the wireless terminal, updating, by the second wireless private network system, subscriber information of the wireless terminal into its subscriber information database by re-registrating the location information of the wireless terminal to synchronize the location re-registered subscriber information of the wireless terminal with associated wireless private network systems in the multi-zone via the first network, wherein the location re-registered subscriber information synchronization step (b) comprises:
  - after the initial subscriber information synchronization step (a), if the location registration message is received from the wireless terminal, retrieving a subscriber information database based upon the location information contained in the received location registration message to compare initially registered location information of the wireless terminal with present location information thereof;
  - if the initially registered location information of the wireless terminal is different from the present location information of the wireless terminal as a result of the comparing step, judging that the wireless terminal moved to the service area of the second wireless private network system, re-registrating the location information of the wireless terminal into its own subscriber information database, and updating the subscriber information; and
  - transferring a synchronization-request message for the updated subscriber information to the associated wireless private network systems in the multi-zone via the first network to synchronize subscriber information databases of the associated wireless private network systems together, wherein the subscriber information database synchronization step comprises:
    - inspecting a subscriber information modification flag of the location re-registered wireless terminal to judge whether associated system synchronization according to subscriber information modification is necessary;
    - if the associated system synchronization according to subscriber information modification is necessary, inspecting the link status of the associated wireless private network systems in the multi-zone; and
    - if the link status is normal, transferring a synchronization-request message for subscriber information synchronization with the associated wireless private network systems according to associated wireless private network system IDs to the associated wireless private network systems via the first network.

10. A synchronization method of subscriber information for a roaming service of wireless private network systems in a multi-zone, the method comprising the following steps of:
- inspecting a synchronization flag of subscriber information of each registered wireless terminal to judge whether initial subscriber information synchronization of associated wireless private network systems in the multi-zone is necessary;
- inspecting the link status with the associated wireless private network systems in the multi-zone;
- when it is judged that the link status is normal, transferring a synchronization-request message for at least one having a set synchronization flag of the subscribers registered in its subscriber information database to the associated wireless private network systems via a network; and
- when synchronization-request reply messages informing synchronization completion through update of the subscriber information are received from the associated wireless private network systems, completing the initial subscriber information synchronization.

11. A synchronization method of subscriber information for a roaming service of wireless private network systems in a multi-zone, which are associated with one another via a network, in a situation that subscriber information initial synchronization is completed at system initialization, the method comprising the following steps of:
- when the subscriber information is modified via a User Interface (UI), updating the subscriber information into the subscriber information databases and setting a flag of the modified subscriber information;
- inspecting the set subscriber information modification flag to judge whether synchronization according to subscriber information modification is necessary;
- when the synchronization according to subscriber information modification is necessary, inspecting the link status of the associated wireless private network systems in the multi-zone;
- when it is judged that the link status is normal, transferring a synchronization-request message containing the modified subscriber information for subscriber information synchronization to each associated wireless private network system via the network; and
- when a synchronization-request reply message informing synchronization completion through update of the subscriber information is received from the associated wireless private network systems, resetting a corresponding subscriber information modification flag to synchronize the modified subscriber information.

12. The method according to claim 11, wherein the modified subscriber information synchronization inspects the subscriber information modification flag from the User Interface (UI) at modification of the subscriber information or at a predetermined period, and if the modification flag exists, executing the modified subscriber information synchronization of the associated wireless private network systems.

13. A roaming service system of wireless private network systems in a multi-zone comprising:
- means for interfacing a signal for call connection of wireless terminals located in service areas of the respective wireless private network systems in the multi-zone;

means for synchronizing subscriber information of wireless terminals with associated private wireless network systems via a network, wherein the synchronization means synchronize subscriber information registered in the respective wireless private network systems at initialization of the respective wireless private network systems, subscriber information modified via a User Interface (UI), and location re-registered subscriber information at the movement of a wireless terminal from one service area to another service area of the respective wireless private network system;

means for storing the subscriber information synchronized among the wireless private network systems by the synchronizing means, wherein the synchronizing means comprises;

a first processor for executing initial synchronization by initializing common information of the respective wireless private network systems and transferring the subscriber information stored in their own storage means at initialization of the respective wireless network systems to the associated wireless private network systems via the network;

a second processor for transferring a synchronization-request message containing modified subscriber information, when the subscriber information is modified in operation of the respective wireless private network systems, to the associated wireless private network systems;

a third processor for receiving an initial synchronization-request message, an in-operation synchronization-request message and a reply message in response to the synchronization-request message transferred via at least one of second processors of the associated wireless private network systems, the reply message including the subscriber information at initialization and the modified subscriber information in operation;

a fourth processor for temporarily storing the message from the third processor according to message type and updating the subscriber information stored in the storage means according to the message type of the temporarily stored message;

a fifth processor for transferring a link-check message and judging the link status of the respective wireless private network systems for synchronization of the subscriber information at system initialization or subscriber information modification; and a sixth processor for receiving a link-check message from at least one of fifth processors of the associated wireless private network systems.

14. The system according to claim 13, wherein the synchronization means execute the system initial synchronization according to the following steps of:

(a) inspecting, by the second processor, synchronization flags of the subscriber information of wireless terminals registered in the storage means to judge whether it is necessary to initially synchronize the subscriber information of the associated wireless private network systems in the multi-zone;

(b) when it is necessary to initially synchronize the subscriber information, inspecting, by the fifth processor, the link status of the associated wireless private network systems in the multi-zone; and (c) when the link status is normal, transferring, by the second processor, the synchronization-request message for at least one having a set synchronization flag of the wireless terminals registered in the storage means to the associated wireless private network systems via the network.

15. The roaming service system according to claim 13, wherein the synchronization means synchronize the modified subscriber information according to the following steps of:

(a) when the modified subscriber information is made via the User Interface (UI) after completing the initial synchronization, by the fourth processor, updating the subscriber information stored in the storage means with the modified subscriber information and setting a flag of the modified subscriber information;

(b) inspecting, by the second processor, the subscriber information modification flag to judge whether it is necessary to synchronize in response to the subscriber information modification, and if it is judged necessary, by the fifth processor, inspecting the link status of the associated wireless private network systems in the multi-zone;

(c) when the link status is normal, transferring the synchronization-request message for the re-registered subscriber information in the storage means to at least one of the wireless private network systems associated with the second processor via the network; and (d) when the third processor receives the reply message about synchronization completion through update of the subscriber information from the associated wireless private network systems, resetting, by the second processor, the subscriber modification flag to complete the synchronization of the modified subscriber information.

16. The system according to claim 13, wherein the synchronization means synchronize the location re-registered subscriber information according to the following steps of:

(a) by the fourth processor, updating the subscriber information of the location re-registered wireless terminal into the storage means and setting a flag of location re-registered subscriber information;

(b) inspecting, by the second processor, the subscriber information re-registration flag to judge whether synchronization according to the subscriber information re-registration is necessary, and if it is judged that the synchronization is necessary, inspecting, by the fifth processor, the link status with the associated wireless private network systems in the multi-zone;

(c) when it is judged that the link status is normal, transferring the synchronization-request message for the location re-registered subscriber information in the storage means to at least one of the wireless private network systems associated with the second processor via the network; and (d) when the third processor receives the reply message about synchronization completion through update of the subscriber information from the associated wireless private network systems, resetting, by the second processor, the subscriber modification flag to complete the synchronization of the modified subscriber information.

17. A synchronization system of subscriber information for a roaming service of wireless private network systems in a multi-zone, comprising:

a first processor for executing initial synchronization by initializing common information of the respective wireless private network systems and transferring the subscriber information stored in their own storage means at initialization of the respective wireless network systems to the associated wireless private network systems via the network;
a second processor for transferring a synchronization-request message containing modified subscriber information, when the subscriber information is modified in operation of the respective wireless private network systems, to the associated wireless private network systems;
a third processor for receiving an initial synchronization-request message, an in-operation synchronization-request message and a reply message in response to the synchronization-request message transferred via at least one of second processors of the associated wireless private network systems, the reply message including the subscriber information at initialization and the modified subscriber information in operation;
a fourth processor for temporarily storing the message from the third processor according to message type and updating the subscriber information stored in the storage means according to the message type of the temporarily stored message;
a fifth processor for transferring a link-check message and judging the link status of the respective wireless private network systems for synchronization of the subscriber information at system initialization or subscriber information modification; and
a sixth processor for receiving a link-check message from at least one of fifth processors of the associated wireless private network systems.

* * * * *